United States Patent
Li et al.

(10) Patent No.: US 10,491,471 B2
(45) Date of Patent: Nov. 26, 2019

(54) RADIO CONFIGURATION METHOD FOR WEARABLE DEVICE, RELATED DEVICE, AND BASE STATION

(71) Applicant: HUAWEI TECHNOLOGIES CO., LTD., Shenzhen, Guangdong (CN)

(72) Inventors: Guorong Li, Shenzhen (CN); Nathan Edward Tenny, San Diego, CA (US); Lili Zhang, Beijing (CN)

(73) Assignee: Huawei Technologies Co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 15/760,494

(22) PCT Filed: Dec. 22, 2015

(86) PCT No.: PCT/CN2015/098163
§ 371 (c)(1),
(2) Date: Mar. 15, 2018

(87) PCT Pub. No.: WO2017/107031
PCT Pub. Date: Jun. 29, 2017

(65) Prior Publication Data
US 2018/0254948 A1    Sep. 6, 2018

(51) Int. Cl.
*H04L 12/28* (2006.01)
*H04L 12/24* (2006.01)
(Continued)

(52) U.S. Cl.
CPC ...... *H04L 41/0813* (2013.01); *H04L 41/0806* (2013.01); *H04W 76/10* (2018.02); *H04W 76/27* (2018.02); *H04W 88/04* (2013.01)

(58) Field of Classification Search
CPC .......... H04L 41/0806; H04L 41/0813; H04W 76/10; H04W 76/11; H04W 76/14;
(Continued)

(56) References Cited

U.S. PATENT DOCUMENTS

2010/0002656 A1  1/2010  Ji et al.
2012/0063369 A1  3/2012  Lin et al.
(Continued)

FOREIGN PATENT DOCUMENTS

CN    104471921 A    3/2015
CN    204707282 U   10/2015
(Continued)

OTHER PUBLICATIONS

3GPP TS 36.300 V13.1.0 (Sep. 2015),3rd Generation Partnership Project;Technical Specification Group Radio Access Network;Evolved Universal Terrestrial Radio Access (E-UTRA) and Evolved Universal Terrestrial Radio Access Network (E-UTRAN);Overall description;Stage 2(Release 13),dated Sep. 2015,total 254 pages.
(Continued)

*Primary Examiner* — Abdelillah Elmejjarmi
(74) *Attorney, Agent, or Firm* — Fish & Richardson P.C.

(57) ABSTRACT

The present invention provides a radio configuration method. The method includes: receiving, by user equipment, a radio resource control (RRC) connection request sent by the wearable device, where the RRC connection request carries identifier information identifying the wearable device; establishing, by the user equipment, an RRC connection with the wearable device; sending, by the user equipment, an RRC message to a base station, where the RRC message carries the identifier information; receiving, by the user equipment, the identifier information and first configuration information that are sent by the base station; performing, by the user equipment, radio configuration on a first interface and a second interface according to the first configuration information and the identifier information; and generating, by the user equipment, second configuration information according to the first configuration information,
(Continued)

and sending the second configuration information to the wearable device.

17 Claims, 11 Drawing Sheets

(51) Int. Cl.
*H04W 76/27* (2018.01)
*H04W 76/10* (2018.01)
*H04W 88/04* (2009.01)

(58) Field of Classification Search
CPC ..... H04W 76/38; H04W 76/27; H04W 84/18; H04W 88/04
See application file for complete search history.

(56) References Cited

U.S. PATENT DOCUMENTS

| | | |
|---|---|---|
| 2014/0177449 A1 | 6/2014 | Novak et al. |
| 2016/0100303 A1 | 4/2016 | Kim et al. |
| 2016/0212682 A1* | 7/2016 | Chung .................. H04W 76/14 |
| 2016/0227511 A1 | 8/2016 | Shan et al. |
| 2017/0078837 A1 | 3/2017 | Liang et al. |
| 2018/0098249 A1* | 4/2018 | Lee .................... H04W 36/0011 |
| 2019/0053135 A1* | 2/2019 | Hahn .................... H04W 76/11 |

FOREIGN PATENT DOCUMENTS

| | | |
|---|---|---|
| CN | 105163266 A | 12/2015 |
| WO | 2010006649 A1 | 1/2010 |
| WO | 2015047167 A1 | 4/2015 |
| WO | 2015095172 A1 | 6/2015 |

OTHER PUBLICATIONS

Balaji Raghothaman et al.,"System Architecture for a Cellular Network with UE Relays for Capacity and Coverage Enhancement",InterDigital Communications LLC,dated 2012,total 6 pages.
International Search Report issued in International Application No. PCT/CN2015/098163 dated Sep. 12, 2016, 13 pages.
Extended European Search Report issued in European Application No. 15911030.3 dated Sep. 27, 2018, 6 pages.
Office Action issued in Chinese Application No. 201580075321.0 dated Apr. 22, 2019, 6 pages.

* cited by examiner

RADIO CONFIGURATION METHOD FOR WEARABLE DEVICE, RELATED DEVICE, AND BASE STATION

CROSS-REFERENCE TO RELATED APPLICATIONS

This application is a national stage of International Application No. PCT/CN2015/098163, filed on Dec. 22, 2015, which is hereby incorporated by reference in its entirety.

TECHNICAL FIELD

The present invention relates to the communications field, and in particular, to a radio configuration method for a wearable device.

BACKGROUND

A wearable device is a portable device that is directly worn on a human body or integrated with clothes or an accessory of a user. The wearable device is not merely a hardware device. For example, the wearable device embeds multimedia, a sensor, a wireless communications technology, and the like onto human clothes, and can support various interaction manners such as gesture control and eye movement control. Nowadays, the wearable device can be used for instant communication, identity identification, sports recording, health monitoring, locating and attending, and the like. Technology development of the wearable device brings more possibilities to an integrated, portable, and versatile product.

One or more wearable devices may access a network by using relay user equipment. Currently, for a typical wearable device in the prior art, for example, a smartwatch, a mobile terminal serves as relay user equipment. The smartwatch uses Bluetooth to pair with the mobile terminal, and accesses a network by using the mobile terminal. A base station performs radio configuration on the mobile terminal. The smartwatch and the mobile terminal perform a same service, and existence of a service of the smartwatch depends on the mobile terminal. For example, if the mobile terminal can perform a voice service, a user may use the smartwatch instead of the mobile terminal to perform the voice service. The smartwatch is wearable, so it is quite convenient for the user to use the smartwatch to perform the voice service in a mobile-terminal unfriendly scenario.

In the prior art, the base station configures only signaling and services that are related to relay user equipment, and the wearable device only reflects the relay user equipment service, and cannot autonomously perform a service. In addition, the base station cannot recognize an identifier of the wearable device, perform addressing on the wearable device independently, or perform radio configuration on the wearable device.

SUMMARY

The present invention provides a radio configuration method for a wearable device, a related device, and a base station, to perform radio configuration on the wearable device, so that the wearable device can autonomously perform a service.

A first aspect of the present invention provides a radio configuration method for a wearable device, and the method is applied to user equipment. A communications system in the present invention includes a base station, a wearable device (Wearable Device, WD), and user equipment (User equipment, UE). Each user equipment can support one or more wearable devices, and each wearable device is connected to the base station by using the user equipment. A link between the wearable device and the user equipment may be based on a BT (Bluetooth, Bluetooth) or WIFI (WIreless-Fidelity, wireless fidelity) technology, or another non-LTE (Long Term Evolution, Long Term Evolution in universal mobile telecommunication technologies) transport layer protocol.

The user equipment receives a radio resource control RRC connection request sent by the wearable device. The RRC connection request carries identifier information of the wearable device, and the identifier information is used to identify the wearable device. The wearable device can support multiple wearable devices. Therefore, the user equipment may determine, by using the identifier information of the wearable device, a message sent to the user equipment and a message sent to the wearable device, and determine a particular wearable device to which a message is sent.

The user equipment establishes an RRC connection with the wearable device according to the RRC connection request. The RRC connection is established between the user equipment and the wearable device, that is, a signaling channel is established between the user equipment and the wearable device, and signaling transmission can be performed. Each wearable device establishes an RRC connection with the user equipment. The user equipment sends an RRC message to the base station. The RRC message carries the identifier information used to identify the wearable device, and the RRC message is used to inform the base station that an RRC connection has been established between the wearable device corresponding to the identifier information and the user equipment.

The user equipment receives first configuration information sent by the base station. The first configuration information also carries the identifier information. The user equipment may determine, by using the identifier information, whether the first configuration information is configuration information related to resource configuration of the user equipment or configuration information related to the wearable device, and determine a particular wearable device corresponding to the first configuration information. The user equipment performs radio configuration on the wearable device according to the received first configuration information and the received identifier information.

In a scenario in which the wearable device is connected to the base station by using the user equipment, an RRC connection is established between the user equipment and the base station, and an RRC connection is established between the wearable device and the user equipment, so that signaling transmission can be performed between the base station and the wearable device. The user equipment receives the first configuration information sent by the base station, and performs resource configuration on a first interface and a second interface according to the first configuration information and the identifier information. The first interface is a communications interface between the user equipment and the base station, and the second interface is a communications interface between the user equipment and the wearable device. The user equipment generates second configuration information according to the first configuration information. The user equipment performs resource configuration on the first interface according to the first configuration information, and correspondingly performs resource configuration on the second interface according to a resource configuration status of the first interface. The user equipment generates the second configuration information according to a resource configuration status corresponding to the second interface, and sends the second configuration information to the wearable device. The second configuration information is used to instruct the wearable device to perform radio configuration, so that the wearable device and the base station can perform service data transmission, and the wearable device can autonomously perform a related service.

When configuration information corresponding to the first interface and configuration information corresponding to the second interface are the same, the first configuration information and the second configuration information may be the same or may be different. Optionally, the user equipment receives a first reconfiguration message sent by the base station. The first reconfiguration message carries the identifier information and first configuration information for establishing a data radio bearer (Data Radio Bearer, DRB). The first reconfiguration message is sent to the user equipment by the base station according to a service request. The service request may be initiated by the wearable device or a server, and no limitation is set herein.

The user equipment performs DRB establishment resource configuration on the first interface and the second interface according to the first configuration information for establishing a DRB and the identifier information. The user equipment establishes a first DRB for the first interface, and establishes a second DRB for the second interface. Establishing a second DRB includes establishing a channel for communicating with BT, and configuring an RLC entity and a PDCP entity. The user equipment establishes a route between LTE physical and data link layers (L1/L2), and a route between the BT and the data link layer (BT/L2) inside the user equipment, for transmitting DRB data between the wearable device and the base station. Each DRB is corresponding to one service.

The user equipment sends a second reconfiguration message to the wearable device. The second reconfiguration message carries second configuration information for establishing a DRB, and the second configuration information for establishing a DRB is used by the wearable device to perform DRB establishment resource configuration.

The user equipment receives a reconfiguration complete message sent by the wearable device. The reconfiguration complete message also carries the identifier information, and is used to inform the user equipment that reconfiguration of the wearable device corresponding to the identifier information is complete. The user equipment then forwards the reconfiguration complete message to the base station, to inform the base station of completed resource configuration of the wearable device.

In a scenario in which the wearable device is connected to the base station by using the user equipment, an RRC connection is established between the user equipment and the base station, and an RRC connection is established between the wearable device and the user equipment, so that signaling transmission can be performed between the base station and the wearable device. The user equipment receives the first configuration information sent by the base station, and performs radio configuration on the first interface and the second interface according to an indication of the first configuration information. The user equipment generates the second configuration information according to the first configuration information, and sends the second configuration information to the wearable device, so that the wearable device performs radio configuration according to the second configuration information, the wearable device and the base station can perform service data transmission, and the wearable device can autonomously perform a related service.

Optionally, after receiving the reconfiguration complete message sent by the wearable device and sending the reconfiguration complete message to the base station, the user equipment receives a third reconfiguration message sent by the base station. The third reconfiguration message carries the identifier information and configuration information for modifying a DRB. The third reconfiguration message is sent to the user equipment by the base station according to a service request. The service request may be initiated by the wearable device or a server, and no limitation is set herein.

The user equipment performs DRB modification resource configuration on the first interface and the second interface according to the first configuration information for modifying a DRB and the identifier information. A specific method includes: for the first interface, modifying, by the user equipment, a corresponding first DRB indicated in the first configuration information; and for the second interface, modifying, by the user equipment, a corresponding second DRB indicated in the first configuration information, including configuring the channel for communicating with the BT, and configuring the RLC entity and the PDCP entity.

After completing the configuration on the first interface and the second interface, the user equipment sends a fourth reconfiguration message to the wearable device. The fourth reconfiguration message carries second configuration information for modifying a DRB, and the second configuration information for modifying a DRB is used by the wearable device to perform DRB modification resource configuration. When the wearable device successfully completes DRB modification configuration, the wearable device sends a reconfiguration complete message to the user equipment. The reconfiguration complete message carries the identifier information, and is used to inform the user equipment that the wearable device corresponding to the identifier information has completed DRB modification resource configuration.

The user equipment receives the reconfiguration complete message sent by the wearable device. The reconfiguration complete message also carries the identifier information, and indicates that reconfiguration of the wearable device is complete. The user equipment forwards the reconfiguration complete message to the base station, to inform the base station that the wearable device has completed radio bearer establishment resource configuration. The user equipment forwards the reconfiguration complete message to the base station. The reconfiguration complete message is used to inform the base station that the wearable device has completed radio bearer modification resource configuration.

The user equipment receives the first configuration information that is corresponding to the wearable device and that is sent by the base station. The user equipment generates the second configuration information according to the first configuration information, and sends the second configuration information to the wearable device. The second configuration information is used to instruct the wearable device to perform DRB modification radio configuration, so that the wearable device can autonomously perform different services.

Optionally, after receiving the reconfiguration complete message sent by the wearable device and sending the reconfiguration complete message to the base station, the user equipment receives a fifth reconfiguration message sent by the base station. The fifth reconfiguration message carries the identifier information and first configuration information for releasing a DRB. The fifth reconfiguration message is sent to the user equipment by the base station according to a service request. The service request may be initiated by the wearable device or a server, and no limitation is set herein.

The user equipment performs DRB release resource configuration on the first interface and the second interface according to the first configuration information for releasing a DRB and the identifier information. Configuration performed by the user equipment on the first interface may be: releasing, by the user equipment, a corresponding DRB indicated in the first configuration information. Configuration performed by the user equipment on the second interface may be: releasing a corresponding DRB indicated in the first configuration information, including releasing the channel for communicating with the BT, the RLC entity, and the PDCP entity.

The user equipment sends a sixth reconfiguration message to the wearable device. The sixth reconfiguration message carries second configuration information for releasing a DRB, and the second configuration information for releasing a DRB is used by the wearable device to perform DRB release resource configuration. When the wearable device successfully completes DRB release configuration, the wearable device sends a reconfiguration complete message to the user equipment, and the user equipment forwards the reconfiguration complete message to the base station. The reconfiguration complete message is used to inform the base station that the wearable device has completed DRB release resource configuration.

On a basis that a DRB is established between the wearable device and the base station, the user equipment receives the first configuration information from the base station, and performs configuration on the first interface and the second interface according to the first configuration information. After configuration is complete, the user equipment generates the second configuration information according to the first configuration information, and sends the second configuration information to the wearable device, so that the wearable device completes DRB release radio configuration according to an indication of the second configuration information, to save radio resources.

Optionally, the user equipment receives a seventh reconfiguration message sent by the base station. The seventh reconfiguration message carries the identifier information and first configuration information for establishing a signaling radio bearer. The configuration information for establishing a signaling radio bearer is used to establish a signaling radio bearer for transmitting a non-access stratum NAS message. The seventh reconfiguration message is sent to the user equipment by the base station according to a service request. The service request may be initiated by the wearable device or a server, and no limitation is set herein.

The user equipment performs signaling radio bearer SRB2 establishment resource configuration on the first interface and the second interface according to the first configuration information for establishing a signaling radio bearer and the identifier information. A specific method is as follows: A configuration process of the first interface may be: modifying an existing SRB2 channel of the first interface, so that the SRB2 channel is also used to transmit an SRB2 message of the wearable device, and an SRB2 message of the user equipment and the SRB2 message of the wearable device are distinguished by using the identifier information; or, establishing a new SRB, which may be referred to as an SRB3, where the SRB3 is used to transfer an SRB2 message of the wearable device; or, establishing a new DRB to transfer an SRB2 message of the wearable device. A specific process for performing, by the user equipment, configuration on the second interface may be: establishing, by the user equipment, an SRB2 between the user equipment and the wearable device, including establishing the channel for communicating with the BT, and configuring the RLC entity and the PDCP entity; and establishing, by the user equipment, a route between LTE L1/L2 and a route between BT/L2 inside the user equipment, for transmitting an SRB2 message between the user equipment and the wearable device.

The user equipment sends an eighth reconfiguration message to the wearable device. The eighth reconfiguration message carries second configuration information for establishing a signaling radio bearer. The second configuration information for establishing a signaling radio bearer SRB2 is used by the wearable device to perform signaling radio bearer establishment resource configuration.

The user equipment receives a reconfiguration complete message sent by the wearable device. The reconfiguration complete message is sent by the wearable device to the user equipment when the wearable device completes SRB2 establishment.

The user equipment forwards the reconfiguration complete message to the base station. The reconfiguration complete message is used to inform the base station that the wearable device has completed SRB2 establishment resource configuration, and the reconfiguration complete message carries the identifier information.

Optionally, the establishing, by the user equipment, an RRC connection with the wearable device according to the RRC connection request includes: receiving, by the user equipment, the RRC connection request sent by the wearable device; sending, by the user equipment, an RRC connection response to the wearable device according to the RRC connection request; receiving, by the user equipment, an RRC connection complete message sent by the wearable device, where the RRC connection complete message is generated by the wearable device according to the RRC connection response; and determining, by the user equipment according to the RRC connection complete message, that an RRC connection has been established between the user equipment and the wearable device.

Optionally, a process of releasing an RRC connection between the user equipment and the wearable device is as follows: sending, by the user equipment after sending the second configuration information to the wearable device, a first RRC connection release message to the wearable device, where the RRC connection release message carries the identifier information;

releasing, by the user equipment, a radio resource that is allocated to the wearable device indicated by the identifier information; and sending, by the user equipment, a second RRC connection release message to the base station, where the second RRC connection release message carries the identifier information, and is used to inform the base station that an RRC connection indicated by the identifier information has been released.

If in a preset period of time, the user equipment does not receive data sent by the wearable device, or the user equipment does not receive data that needs to be sent by the base station to the wearable device by using the user equipment, the user equipment may release the RRC connection between the user equipment and the wearable device, to reduce radio resource overheads.

Optionally, the user equipment configures, for the wearable device, a wearable device index corresponding to the identifier information of the wearable device.

The user equipment sends the wearable device index to the wearable device, where the wearable device index is used to identify the wearable device. In a message sent by the user equipment to the wearable device, bits used to carry the wearable device index are less than bits used to carry the identifier information. Therefore, using the wearable device index to identify the wearable device can effectively reduce signaling overheads. In this application, except that the identifier information of the wearable device is carried in the RRC connection request sent by the wearable device to the user equipment, other identifier information may alternatively be the wearable device index.

A second aspect of the present invention provides a radio configuration method for a wearable device, and the method is applied to a wearable device. A communications system in the present invention includes a base station, a wearable device (Wearable Device, WD), and user equipment (User equipment, UE). Each user equipment can support one or more wearable devices, and each wearable device is connected to the base station by using the user equipment. A link between the wearable device and the user equipment may be based on a BT (Bluetooth, Bluetooth) or WIFI (WIreless-Fidelity, wireless fidelity) technology, or another non-LTE (Long Term Evolution, Long Term Evolution in universal mobile telecommunication technologies) transport layer protocol.

The wearable device sends a radio resource control RRC connection request to the user equipment. The RRC connection request carries identifier information of the wearable device, and the identifier information is used to identify a message sent by the wearable device.

The wearable device receives an RRC connection response sent by the user equipment. The RRC connection response is generated by the user equipment according to the RRC connection request.

The wearable device sends an RRC message to the user equipment according to the RRC connection response, so that the user equipment sends an RRC message to the base station. The RRC message is used to indicate that an RRC connection has been established between the wearable device and the user equipment, and the RRC message includes the identifier information used to identify the wearable device.

The wearable device receives second configuration information sent by the user equipment, and performs radio configuration according to the second configuration information. The second configuration information is generated by the user equipment according to first configuration information. The first configuration information is sent by the base station to the user equipment, and is used to instruct the user equipment to configure a first interface and a second interface according to the first configuration information.

In a scenario in which the wearable device is connected to the base station by using the user equipment, an RRC connection is established between the user equipment and the base station, and an RRC connection is established between the wearable device and the user equipment, so that signaling transmission can be performed between the base station and the wearable device. The wearable device receives the second configuration information sent by the user equipment, and performs radio configuration according to the second configuration information, so that the wearable device and the base station can perform service data transmission, and the wearable device can autonomously perform a related service.

Optionally, the wearable device receives a second reconfiguration message sent by the user equipment. The second reconfiguration message carries second configuration information for establishing a DRB. The wearable device performs DRB establishment resource configuration according to the second configuration information for establishing a DRB.

When the wearable device completes DRB establishment resource configuration, the wearable device sends a reconfiguration complete message to the user equipment, to inform the user equipment that the wearable device has completed DRB establishment resource configuration.

In a scenario in which the wearable device is connected to the base station by using the user equipment, the wearable device receives the second configuration information for establishing a DRB sent by the user equipment, and performs DRB establishment radio configuration according to the second configuration information for establishing a DRB, so that the wearable device and the base station can perform service data transmission. Each DRB is corresponding to one service, and the wearable device can autonomously perform a related service.

Optionally, after performing radio configuration according to the second configuration information, the wearable device receives a fourth reconfiguration message sent by the user equipment. The fourth reconfiguration message carries second configuration information for modifying a DRB. The wearable device performs DRB modification resource configuration according to the second configuration information for modifying a DRB.

The wearable device receives the second configuration information for modifying a DRB sent by the user equipment, and performs DRB modification radio configuration according to the second configuration information for modifying a DRB. Each DRB is corresponding to one service, the wearable device performs, according to the second configuration information for modifying a DRB, DRB modification radio configuration, and the wearable device performs a service corresponding to a modified DRB.

Optionally, after performing radio configuration according to the second configuration information, the wearable device receives a sixth reconfiguration message sent by the user equipment. The sixth reconfiguration message carries second configuration information for releasing a DRB. The wearable device performs DRB release resource configuration according to the second configuration information for releasing a DRB.

When the wearable device successfully completes DRB release configuration, the wearable device sends a reconfiguration complete message to the user equipment, to inform the user equipment that the wearable device corresponding to the identifier information has completed DRB release resource configuration.

The wearable device may release an established DRB according to the second configuration information for releasing a DRB, to save radio resources.

Optionally, the wearable device receives an eighth reconfiguration message sent by the user equipment. The eighth reconfiguration message carries second configuration information for establishing a signaling radio bearer SRB2.

The wearable device performs signaling radio bearer establishment resource configuration according to the second configuration information for establishing a signaling radio bearer SRB2.

After performing radio configuration according to the second configuration information, the wearable device sends a reconfiguration complete message to the user equipment, to inform the user equipment that the wearable device has completed signaling radio bearer SRB2 establishment configuration, so that the user equipment forwards the reconfiguration complete message to the base station, to inform the base station that the wearable device has completed radio bearer establishment resource configuration. The reconfiguration complete message carries the identifier information.

Optionally, after performing radio configuration according to the second configuration information, the wearable device receives a first RRC connection release message sent by the user equipment. The first RRC connection release message carries the identifier information.

The wearable device releases the RRC connection between the wearable device and the user equipment according to the first RRC connection release message, and releases a radio resource.

After receiving the first RRC connection release message sent by the user equipment, the wearable device receives the first RRC connection release message, releases the RRC connection between the wearable device and the user equipment according to the first RRC connection release message, and releases radio configuration of the wearable device, including releasing a channel for communicating with the BT, an RLC entity, and a PDCP entity.

Optionally, the identifier information includes the identifier information of the wearable device or a wearable device index. When the identifier information is a wearable device index, after sending the radio resource control RRC connection request to the user equipment, the wearable device receives a wearable device index sent by the user equipment. The wearable device index is obtained by configuring, by the user equipment, an index corresponding to the identifier information of the wearable device.

A third aspect of the present invention provides a radio configuration method for a wearable device, and the method is applied to a base station. A communications system in the present invention includes a base station, a wearable device, and user equipment. Each user equipment can support one or more wearable devices, and each wearable device is connected to the base station by using the user equipment.

The base station receives an RRC message sent by the user equipment. The RRC message carries identifier information used to identify the wearable device and a related message of the wearable device. The related message of the wearable device includes connection information, bearer information, and the like of the wearable device. The RRC message is used to indicate that an RRC connection has been established between the wearable device and the user equipment. When receiving the RRC message and determining that an RRC connection has been established between the wearable device and the user equipment, the base station creates, based on the related message of the wearable device in the RRC message, a context of the wearable device, and establishes an internal SRB1 for the wearable device. When the base station needs to send an SRB1 message to the wearable device, because the SRB1 message to be sent to the wearable device needs to be first sent to the user equipment through a communications interface between the user equipment and the base station, the base station needs to internally nest the context of the wearable device into a context of the user equipment, and sends, to the user equipment according to a context obtained by means of nesting, the SRB1 message to be sent to the wearable device.

The base station sends the identifier information and first configuration information to the user equipment. The first configuration information is used to instruct the user equipment to perform radio configuration on a first interface and a second interface. The first interface is a communications interface between the user equipment and the base station, and the second interface is a communications interface between the user equipment and the wearable device.

Optionally, the base station sends a first reconfiguration message to the user equipment according to a service request, and sends the first reconfiguration message to the user equipment. The first reconfiguration message carries the identifier information and first configuration information for establishing a data radio bearer DRB. The first reconfiguration message is sent to the user equipment by the base station according to a service request. The service request may be initiated by the wearable device or a server. If the service request is initiated by the wearable device, the wearable device sends the service request to the user equipment, the base station sends, to a core network, the service request sent by the user equipment, and the core network sends a message to the base station according to the service request. The message includes related information such as service bearer establishment information. The base station receives the message, and sends the first reconfiguration message to the user equipment. The first reconfiguration message carries the identifier information and the first configuration information for establishing a data radio bearer DRB.

If the service request is initiated by a server, the server sends the service request to a core network, and the core network sends a message to the base station according to the service request. The message carries the first configuration information. The base station receives the message sent by the core network, and sends the first reconfiguration message to the user equipment. The user equipment may learn, according to the identifier information, that the first reconfiguration message is a message sent to the wearable device.

The first configuration information for establishing a data radio bearer DRB is used to instruct the user equipment to perform DRB establishment resource configuration on the first interface and the second interface. Second configuration information for establishing a data radio bearer DRB is carried in a second reconfiguration message sent by the user equipment to the wearable device. The second configuration information for establishing a DRB is used by the wearable device to perform DRB establishment resource configuration, and the second configuration information is generated by the user equipment according to the first configuration information.

The base station sends the first configuration information for establishing a DRB to the user equipment, so that the user equipment performs DRB establishment resource configuration on the first interface and the second interface according to the first configuration information for establishing a DRB, and sends, to the wearable device, the second configuration information generated according to the first configuration information, and the wearable device performs DRB establishment resource configuration.

Optionally, after sending the first reconfiguration message to the user equipment, the base station sends a third reconfiguration message to the user equipment. The third reconfiguration message carries the identifier information and first configuration information for modifying a DRB. The first configuration information for establishing a data radio bearer DRB is used to instruct the user equipment to perform DRB modification resource configuration on the first interface and the second interface. Second configuration information for modifying a DRB is carried in a fourth reconfiguration message sent by the user equipment to the wearable device, and is used by the wearable device to perform DRB modification resource configuration.

The base station sends the first configuration information for modifying a DRB to the user equipment, so that the user equipment performs DRB modification resource configuration on the first interface and the second interface according to the first configuration information for establishing a DRB, and sends, to the wearable device, the second configuration information generated according to the first configuration information, and the wearable device performs DRB modification resource configuration.

Optionally, after sending the first reconfiguration message to the user equipment, the base station sends a fifth reconfiguration message to the user equipment. The fifth reconfiguration message carries the identifier information and first configuration information for releasing a DRB. The first configuration information for releasing a DRB is used to instruct the user equipment to perform DRB release resource configuration on the first interface and the second interface. Second configuration information for releasing a DRB is carried in a sixth reconfiguration message sent by the user equipment to the wearable device, and is used by the wearable device to perform DRB release resource configuration.

The base station sends the first configuration information for releasing a DRB to the user equipment, so that the user equipment performs DRB establishment resource configuration on the first interface and the second interface according to the first configuration information for establishing a DRB, and sends, to the wearable device, the second configuration information generated according to the first configuration information, and the wearable device performs DRB release resource configuration, to save radio resources.

Optionally, the base station sends a seventh reconfiguration message to the user equipment. The seventh reconfiguration message carries the identifier information and first configuration information for establishing a signaling radio bearer. The first configuration information is used to instruct to establish a signaling radio bearer, so that the established signaling radio bearer is used to transmit a non-access stratum NAS message. The first configuration information is used to instruct the user equipment to perform signaling radio bearer establishment resource configuration on the first interface and the second interface. Second configuration information for establishing a signaling radio bearer is carried in an eighth reconfiguration message sent by the user equipment to the wearable device, and is used by the wearable device to perform signaling radio bearer establishment resource configuration.

The base station sends the first configuration information for establishing a signaling radio bearer to the user equipment, so that the user equipment performs signaling radio bearer establishment resource configuration on the first interface and the second interface according to the first configuration information for establishing a signaling radio bearer, and sends, to the wearable device, the second configuration information generated according to the first configuration information, and the wearable device performs signaling radio bearer establishment resource configuration.

Optionally, after sending the identifier information and the first configuration information to the user equipment, the base station receives a second connection release message sent by the user equipment. The second connection release message is used to inform the base station that the wearable device has been disconnected from the user equipment, and the second RRC connection release message carries the identifier information of the wearable device.

The base station deletes, according to the received second RRC connection release message, context information of the wearable device corresponding to the identifier information. The context information of the wearable device is created by the base station according to the identifier information.

The base station deletes the context information of the wearable device, to save resources.

A fourth method of the present invention provides user equipment. A communications system in the present invention includes a base station, a wearable device, and user equipment. Each user equipment can support one or more wearable devices, and the wearable device is connected to the base station by using the user equipment. The user equipment includes a first receiving module, a communication module, a first sending module, a first resource configuration module, a first release module, and a generation module.

The first receiving module receives an RRC connection request sent by the wearable device. The RRC connection request carries identifier information of the wearable device.

The communication module establishes an RRC connection with the wearable device according to the RRC connection request received by the first receiving module.

The first sending module sends an RRC connection establishment complete message to the base station. The RRC message is used to indicate that an RRC connection has been established between the wearable device and the user equipment, and the RRC message includes the identifier information used to identify the wearable device. The identifier information includes the identifier information or an index that is corresponding to the identifier information and that is configured for the wearable device.

The first receiving module is further configured to receive the identifier information and first configuration information that are sent by the base station.

The first resource configuration module is configured to perform radio configuration on a first interface and a second interface according to the first configuration information and the identifier information that are received by the first receiving module. The first interface is a communications interface between the user equipment and the base station, and the second interface is a communications interface between the user equipment and the wearable device.

The generation module is configured to generate second configuration information according to the first configuration information received by the first receiving module. The first sending module is configured to send the second configuration information to the wearable device. The second configuration information is used by the wearable device to perform radio configuration.

In a scenario in which the wearable device is connected to the base station by using the user equipment, the user equipment establishes an RRC connection with the base station, and establishes an RRC connection with the wearable device by using the communication module, so that signaling transmission can be performed between the base station and the wearable device. The base station sends the first configuration information to the user equipment, and the user equipment performs configuration on the first interface and the second interface according to the first configuration information. The user equipment generates the second configuration information according to the first configuration information, and sends the second configuration information to the wearable device. The wearable device completes radio configuration according to an indication of the second configuration information, so that the wearable device and the base station can perform service data transmission, and the wearable device can autonomously perform a related service.

Optionally, the first receiving module is further configured to receive a first reconfiguration message sent by the base station. The first reconfiguration message carries the identifier information and first configuration information for establishing a data radio bearer DRB.

The first resource configuration module is further configured to perform DRB establishment resource configuration on the first interface and the second interface according to the first configuration information for establishing a DRB and the identifier information that are received by the first receiving module.

The first sending module is further configured to send a second reconfiguration message to the wearable device. The second reconfiguration message carries second configuration information for establishing a DRB, and the second configuration information for establishing a DRB is used by the wearable device to perform DRB establishment resource configuration.

The first receiving module is further configured to receive a reconfiguration complete message sent by the wearable device.

The first sending module is further configured to send the reconfiguration complete message to the base station according to the reconfiguration complete message received by the first receiving module. The reconfiguration complete message is used to inform the base station that the wearable device has completed DRB establishment resource configuration, and the reconfiguration complete message carries the identifier information.

The user equipment receives the first configuration information that is corresponding to the wearable device and that is sent by the base station. The first resource configuration module configures the first interface and the second interface of the user equipment according to an indication of the first configuration information, so that the wearable device and the base station can perform service data transmission. The user equipment sends the second configuration information for establishing a DRB to the wearable device, so that the wearable device can complete DRB establishment radio configuration according to an indication of the second configuration information, and the wearable device can autonomously perform a related service.

Optionally, the first receiving module is further configured to receive a third reconfiguration message sent by the base station. The third reconfiguration message carries the identifier information and first configuration information for modifying a DRB.

The first resource configuration module is further configured to perform DRB modification resource configuration on the first interface and the second interface according to the first configuration information for modifying a DRB and the identifier information that are received by the first receiving module.

The first sending module is further configured to send a fourth reconfiguration message to the wearable device. The fourth reconfiguration message carries second configuration information for modifying a DRB, and the second configuration information for modifying a DRB is used by the wearable device to perform DRB modification resource configuration.

On a basis that a DRB is established between the wearable device and the base station, the first sending module sends the first configuration information to the wearable device. The first resource configuration module completes DRB modification radio configuration on the first interface and the second interface according to an indication of the first configuration information. The user equipment generates, according to the first configuration information for modifying a DRB, the second configuration information for modifying a DRB, and sends the second configuration information to the wearable device, so that the wearable device can autonomously perform different services according to the second configuration information.

Optionally, the first receiving module is further configured to receive a fifth reconfiguration message sent by the base station. The fifth reconfiguration message carries the identifier information and first configuration information for releasing a DRB.

The first resource configuration module is further configured to perform DRB release resource configuration on the first interface and the second interface according to the first configuration information for releasing a DRB and the identifier information that are received by the first receiving module.

The first sending module is further configured to send a sixth reconfiguration message to the wearable device. The sixth reconfiguration message carries second configuration information for releasing a DRB, and the second configuration information for releasing a DRB is used by the wearable device to perform DRB release resource configuration.

The user equipment sends the second configuration information to the wearable device by using the first sending module, so that the wearable device completes DRB release radio configuration according to an indication of the second configuration information, so as to save network radio resources.

Optionally, the first receiving module is further configured to receive a seventh reconfiguration message sent by the base station. The seventh reconfiguration message carries the identifier information and first configuration information for establishing a signaling radio bearer. The first configuration information for establishing a signaling radio bearer is used to instruct to establish a signaling radio bearer for transmitting a non-access stratum NAS message.

The first resource configuration module is further configured to perform signaling radio bearer establishment resource configuration on the first interface and the second interface according to the first configuration information for establishing a signaling radio bearer and the identifier information that are received by the first receiving module.

The first sending module is further configured to send an eighth reconfiguration message to the wearable device. The eighth reconfiguration message carries second configuration information for establishing a signaling radio bearer. The second configuration information for establishing a signaling radio bearer is used by the wearable device to perform signaling radio bearer establishment resource configuration.

The first receiving module is further configured to receive a reconfiguration complete message sent by the wearable device.

The first sending module is further configured to send, to the base station, the reconfiguration complete message received by the first receiving module. The reconfiguration complete message is used to inform the base station that the wearable device has completed radio bearer establishment resource configuration, and the reconfiguration complete message carries the identifier information.

Further, the communication module includes a receiving unit, configured to receive the RRC connection request sent by the wearable device;

a sending unit, configured to send an RRC connection response to the wearable device according to the RRC connection request received by the receiving unit, where the receiving unit is further configured to receive an RRC connection complete message sent by the wearable device, where the RRC connection complete message is generated by the wearable device according to the RRC connection response; and a determining unit, configured to determine, according to the RRC connection complete message received by the receiving unit, that an RRC connection has been established between the user equipment and the wearable device.

Optionally, the first sending module is further configured to send a first RRC connection release message to the wearable device. The RRC connection release message carries the identifier information.

The first release module is configured to release a radio resource that is allocated to the wearable device indicated by the identifier information.

The first sending module is further configured to send a second RRC connection release message to the base station. The second RRC connection release message carries the identifier information, and is used to inform the base station that an RRC connection indicated by the identifier information has been released.

If in a preset period of time, the first receiving module does not receive data sent by the wearable device, or the first receiving module does not receive data that the base station needs to send to the wearable device by using the user equipment, optionally, the first RRC release message may be sent by the sending module to the wearable device. The first release module may release the RRC connection between the user equipment and the wearable device, to reduce radio resource overheads.

Optionally, the configuration module is configured to configure, for the wearable device, a wearable device index corresponding to the identifier information of the wearable device.

The first sending module is further configured to send the wearable device index to the wearable device. The wearable device index is used to identify the wearable device.

Using the wearable device index to identify the wearable device can effectively reduce signaling overheads.

A fifth aspect of the present invention provides a wearable device. A communications system in the present invention includes a base station, a wearable device, and user equipment. Each user equipment can support one or more wearable devices, and the wearable device is connected to the base station by using the user equipment. The wearable device includes a second sending module, a second receiving module, a second resource configuration module, and a second release module.

The second sending module sends a radio resource control RRC connection request to the user equipment. The RRC connection request carries identifier information of the wearable device.

The second receiving module receives an RRC connection response sent by the user equipment. The RRC connection response is generated by the user equipment according to the RRC connection request.

The second sending module is further configured to send an RRC connection establishment complete message to the wearable device according to the RRC connection response received by the second receiving module, so that the user equipment sends an RRC message to the base station. The RRC message is used to indicate that an RRC connection has been established between the wearable device and the user equipment, and the RRC message includes the identifier information used to identify the wearable device.

The second receiving module is further configured to receive second configuration information sent by the user equipment. The second configuration information is generated by the user equipment according to first configuration information, and the first configuration information is sent by the base station to the user equipment.

The second resource configuration module is configured to perform radio configuration according to the second configuration information received by the second receiving module.

Optionally, the second receiving module is further configured to receive a second reconfiguration message sent by the user equipment. The second reconfiguration message carries second configuration information for establishing a DRB.

The second resource configuration module is further configured to perform DRB establishment resource configuration according to the second configuration information for establishing a DRB received by the second receiving module.

The second sending module is further configured to send a reconfiguration complete message to the user equipment. The reconfiguration message is used to instruct the user equipment to send the reconfiguration complete message to the base station, and is used to inform the base station that the wearable device has completed resource configuration. The reconfiguration complete message carries the identifier information.

Optionally, the second receiving module is further configured to receive a fourth reconfiguration message sent by the user equipment. The fourth reconfiguration message carries second configuration information for modifying a DRB.

The second resource configuration module is further configured to perform DRB modification resource configuration according to the second configuration information for modifying a DRB received by the second receiving module.

Optionally, the wearable device further includes the second receiving module, further configured to receive a sixth reconfiguration message sent by the user equipment. The sixth reconfiguration message carries second configuration information for releasing a DRB.

The second release module is configured to perform DRB release resource configuration according to the second configuration information for releasing a DRB received by the second receiving module.

Optionally, the second receiving module is further configured to receive an eighth reconfiguration message sent by the user equipment. The eighth reconfiguration message carries second configuration information for establishing a signaling radio bearer. The second configuration information for establishing a signaling radio bearer is used by the wearable device to perform signaling radio bearer establishment resource configuration.

The second sending module is further configured to send a reconfiguration complete message to the user equipment. The reconfiguration message is used to instruct the user equipment to send the reconfiguration complete message to the base station, and is used to inform the base station that the wearable device has completed resource configuration. The reconfiguration complete message carries the identifier information.

Optionally, the second receiving module is further configured to receive a first RRC connection release message sent by the user equipment. The first RRC connection release message carries the identifier information.

The second release module is further configured to: release, according to the first RRC connection release message received by the second receiving module, the RRC connection between the wearable device and the user equipment, and release a radio resource.

Optionally, the second receiving module is further configured to receive a wearable device index sent by the user equipment. The wearable device index is obtained by configuring, by the user equipment, an index corresponding to the identifier information of the wearable device.

In this embodiment of the present invention, in a scenario in which the wearable device is connected to the base station by using the user equipment, an RRC connection is established between the user equipment and the base station, and an RRC connection is established between the wearable device and the user equipment, so that signaling transmission can be performed between the base station and the wearable device. The base station sends the second configuration information to the wearable device by using the user equipment, and the wearable device completes radio configuration according to an indication of the second configuration information, so that the wearable device can autonomously perform a related service.

A sixth aspect of the present invention provides a base station. A communications system in the present invention includes a base station, a wearable device, and user equipment. Each user equipment can support one or more wearable devices, and the wearable device is connected to the base station by using the user equipment. The base station includes a third receiving module, a third sending module, and a third release module.

The third receiving module is configured to receive an RRC message sent by the user equipment. The RRC message carries identifier information used to identify the wearable device, and the RRC message is used to indicate that an RRC connection has been established between the wearable device and the user equipment.

The third sending module is configured to send the identifier information and first configuration information to the user equipment. Radio configuration is performed on a first interface and a second interface. The first interface is a communications interface between the user equipment and the base station, and the second interface is a communications interface between the user equipment and the wearable device.

The third sending module is further configured to send a first reconfiguration message to the user equipment. The first reconfiguration message carries the identifier information and first configuration information for establishing a data radio bearer DRB. The first configuration information for establishing a data radio bearer DRB is used to instruct the user equipment to perform DRB establishment resource configuration on the first interface and the second interface. Second configuration information for establishing a data radio bearer DRB is carried in a second reconfiguration message sent by the user equipment to the wearable device. The second configuration information for establishing a DRB is used by the wearable device to perform DRB establishment resource configuration, and is generated by the user equipment according to the first configuration information for establishing a DRB.

Optionally, the third sending module is further configured to send a third reconfiguration message to the user equipment. The third reconfiguration message carries the identifier information and first configuration information for modifying a DRB. The first configuration information for establishing a data radio bearer DRB is used to instruct the user equipment to perform DRB modification resource configuration on the first interface and the second interface. Second configuration information for modifying a DRB is carried in a fourth reconfiguration message sent by the user equipment to the wearable device. The second configuration information for modifying a DRB is used by the wearable device to perform DRB modification resource configuration, and is generated by the user equipment according to the first configuration information for modifying a DRB.

Optionally, the third sending module is further configured to send a fifth reconfiguration message to the user equipment. The fifth reconfiguration message carries the identifier information and first configuration information for releasing a DRB. The first configuration information for releasing a DRB is used to instruct the user equipment to perform DRB release resource configuration on the first interface and the second interface. Second configuration information for releasing a DRB is carried in a sixth reconfiguration message sent by the user equipment to the wearable device. The second configuration information for releasing a DRB is used by the wearable device to perform DRB release resource configuration, and is generated by the user equipment according to the first configuration information for releasing a DRB.

Optionally, the third sending module is further configured to send a seventh reconfiguration message to the user equipment. The seventh reconfiguration message carries the identifier information and first configuration information for establishing a signaling radio bearer. The first configuration information for establishing a signaling radio bearer is used to instruct to establish a signaling radio bearer for transmitting a non-access stratum NAS message, and is used to instruct the user equipment to perform signaling radio bearer establishment resource configuration on the first interface and the second interface. Second configuration information for establishing a signaling radio bearer is carried in an eighth reconfiguration message sent by the user equipment to the wearable device. The second configuration information for establishing a signaling radio bearer is used by the wearable device to perform signaling radio bearer establishment resource configuration, and is generated by the user equipment according to the first configuration information for establishing a signaling radio bearer.

Optionally, the third receiving module is configured to receive a second connection release message sent by the user equipment. The second RRC connection release message carries the identifier information of the wearable device.

The third release module is configured to delete, according to the second RRC connection release message received by the third receiving module, context information of the wearable device corresponding to the identifier information. The context information of the wearable device is created by the base station according to the identifier information.

In a scenario in which the wearable device is connected to the base station by using the user equipment, an RRC connection is established between the user equipment and the base station, and an RRC connection is established between the wearable device and the user equipment, so that signaling transmission can be performed between the base station and the wearable device. The base station sends the first configuration information to the user equipment. The first configuration information is used to instruct the user equipment to configure the first interface and the second interface according to the first configuration information, so that a communications channel is established between the wearable device and the base station, and data transmission can be performed between the base station and the wearable device.

A seventh aspect of the present invention provides user equipment. A communications system in the present invention includes a base station, a wearable device, and user equipment. Each user equipment can support one or more wearable devices, and the wearable device is connected to the base station by using the user equipment. The user equipment includes:

a first receiver, a first transmitter, a bus, a first processor, and a first memory.

The first receiver, the first transmitter, the first processor, and the first memory are all connected by using the bus.

The first receiver receives an RRC connection request sent by the wearable device. The RRC connection request carries identifier information of the wearable device.

The first processor establishes an RRC connection with the wearable device according to the RRC connection request received by the first radio frequency module.

The first transmitter sends an RRC connection establishment complete message to the base station. The RRC message is used to indicate that an RRC connection has been established between the wearable device and the user equipment, and the RRC message includes the identifier information used to identify the wearable device.

The first receiver receives the identifier information and first configuration information that are sent by the base station.

The first processor performs radio configuration on a first interface and a second interface according to the first configuration information and the identifier information that are received by the first receiving module. The first interface is a communications interface between the user equipment and the base station, and the second interface is a communications interface between the user equipment and the wearable device.

The first processor generates second configuration information according to the first configuration information.

The first receiver is further configured to receive a first reconfiguration message sent by the base station. The first reconfiguration message carries the identifier information and first configuration information for establishing a data radio bearer DRB.

The first processor is further configured to perform DRB establishment resource configuration on the first interface and the second interface according to the first configuration information for establishing a DRB and the identifier information that are received by the first receiving module.

The first transmitter is further configured to send a second reconfiguration message to the wearable device. The second reconfiguration message carries second configuration information for establishing a DRB, and the second configuration information for establishing a DRB is used by the wearable device to perform DRB establishment resource configuration.

The first receiver is further configured to receive a reconfiguration complete message sent by the wearable device.

The first transmitter is further configured to send the reconfiguration complete message to the base station according to the reconfiguration complete message received by the first receiving module. The reconfiguration complete message is used to inform the base station that the wearable device has completed resource configuration, and the reconfiguration complete message carries the identifier information.

Optionally, the first receiver is further configured to receive a third reconfiguration message sent by the base station. The third reconfiguration message carries the identifier information and first configuration information for modifying a DRB.

The first processor is further configured to: perform DRB modification resource configuration on the first interface and the second interface according to the first configuration information for modifying a DRB and the identifier information that are received by the first receiving module; and generate, according to the first configuration information for modifying a DRB, second configuration information for modifying a DRB.

The first transmitter is further configured to send a fourth reconfiguration message to the wearable device. The fourth reconfiguration message carries the second configuration information for modifying a DRB, and the second configuration information for modifying a DRB is used by the wearable device to perform DRB modification resource configuration.

Optionally, the first receiver is further configured to receive a seventh reconfiguration message sent by the base station. The seventh reconfiguration message carries the identifier information and first configuration information for establishing a signaling radio bearer, and the first configuration information for establishing a signaling radio bearer is used to transmit a non-access stratum NAS message.

The first processor is further configured to: perform signaling radio bearer establishment resource configuration on the first interface and the second interface according to the first configuration information for establishing a signaling radio bearer and the identifier information that are received by the receiving module; and generate, according to the first configuration information for establishing a signaling radio bearer, second configuration information for establishing a signaling radio bearer.

The first transmitter is further configured to send an eighth reconfiguration message to the wearable device. The eighth reconfiguration message carries the second configuration information for establishing a signaling radio bearer. The second configuration information for establishing a signaling radio bearer is used by the wearable device to perform signaling radio bearer establishment resource configuration.

The first receiver is further configured to receive a reconfiguration complete message sent by the wearable device.

The first transmitter is further configured to send, to the base station, the reconfiguration complete message received by the first receiving module. The reconfiguration complete message is used to inform the base station that the wearable device has completed resource configuration, and the reconfiguration complete message carries the identifier information.

Optionally, the first transmitter is further configured to send a first RRC connection release message to the wearable device. The RRC connection release message carries the identifier information.

The first processor is configured to release a radio resource that is allocated to the wearable device indicated by the identifier information.

The first transmitter is further configured to send a second RRC connection release message to the base station. The second RRC connection release message carries the identifier information, and is used to inform the base station that an RRC connection indicated by the identifier information has been released.

The user equipment may release the RRC connection between the user equipment and the wearable device, to reduce radio resource overheads.

Optionally, the first processor is configured to configure, for the wearable device, a wearable device index corresponding to the identifier information of the wearable device.

The first transmitter is further configured to send the wearable device index to the wearable device. The wearable device index is used to identify the wearable device.

In a scenario in which the wearable device is connected to the base station by using the user equipment, the user equipment establishes an RRC connection with the base station, and establishes an RRC connection with the wearable device, so that signaling transmission can be performed between the base station and the wearable device. The base station sends the first configuration information to the user equipment, and the user equipment performs configuration on the first interface and the second interface according to the first configuration information. The user equipment generates the second configuration information according to the first configuration information, and sends the second configuration information to the wearable device. The wearable device completes radio configuration according to an indication of the second configuration information, so that the wearable device and the base station can perform service data transmission, and the wearable device can autonomously perform a related service.

An eighth aspect of the present invention provides user equipment. A communications system in the present invention includes a base station, a wearable device, and user equipment. Each user equipment can support one or more wearable devices, and the wearable device is connected to the base station by using the user equipment. The wearable device includes:

a second receiver, a second transmitter, a bus, a second processor, and a second memory.

The second receiver, the second transmitter, the second processor, and the second memory are all connected by using the bus.

The second transmitter sends a radio resource control RRC connection request to the user equipment. The RRC connection request carries identifier information of the wearable device.

The second receiver receives an RRC connection response sent by the user equipment. The RRC connection response is generated by the user equipment according to the RRC connection request.

The second transmitter is further configured to send an RRC connection establishment complete message to the wearable device according to the RRC connection response received by the second receiver, so that the user equipment sends an RRC message to the base station. The RRC message is used to indicate that an RRC connection has been established between the wearable device and the user equipment, and the RRC message includes the identifier information used to identify the wearable device.

The second receiver receives second configuration information sent by the user equipment. The second configuration information is generated by the user equipment according to first configuration information, and the first configuration information is sent by the base station to the user equipment.

The second processor performs radio configuration according to the second configuration information received by the second receiving module.

Optionally, the second receiver is further configured to receive a second reconfiguration message sent by the user equipment. The second reconfiguration message carries second configuration information for establishing a DRB.

The second processor is further configured to perform DRB establishment resource configuration according to the second configuration information for establishing a DRB received by the second receiving module.

The second transmitter is further configured to send a reconfiguration complete message to the user equipment. The reconfiguration message is used to instruct the user equipment to send the reconfiguration complete message to the base station, and is used to inform the base station that the wearable device has completed resource configuration. The reconfiguration complete message carries the identifier information.

The wearable device completes DRB establishment radio configuration according to an indication of the received second configuration information sent by the user equipment, so that the wearable device can autonomously perform a related service.

Optionally, the second receiver is further configured to receive a fourth reconfiguration message sent by the user equipment. The fourth reconfiguration message carries second configuration information for modifying a DRB.

The second processor is further configured to perform DRB modification resource configuration according to the second configuration information for modifying a DRB received by the second receiving module.

The wearable device completes DRB modification radio configuration according to an indication of the received second configuration information sent by the user equipment. Each DRB is corresponding to one service, and the wearable device performs a service corresponding to a modified DRB.

Optionally, the second receiver is further configured to receive a sixth reconfiguration message sent by the user equipment. The sixth reconfiguration message carries second configuration information for releasing a DRB.

The second processor is further configured to perform DRB release resource configuration according to the second configuration information for releasing a DRB received by the second receiving module.

The wearable device completes DRB release radio configuration according to an indication of the received second configuration information sent by the user equipment, to save radio resources.

Optionally, the second receiver is further configured to receive an eighth reconfiguration message sent by the user equipment. The eighth reconfiguration message carries second configuration information for establishing a signaling radio bearer. The second configuration information for establishing a signaling radio bearer is used by the wearable device to perform signaling radio bearer establishment resource configuration.

The second transmitter is further configured to send a reconfiguration complete message to the user equipment. The reconfiguration message is used to instruct the user equipment to send the reconfiguration complete message to the base station, and is used to inform the base station that the wearable device has completed resource configuration. The reconfiguration complete message carries the identifier information.

Optionally, the second receiver is further configured to receive a first RRC connection release message sent by the user equipment. The first RRC connection release message carries the identifier information.

The second processor is further configured to: release, according to the first RRC connection release message received by the second receiving module, the RRC connection between the wearable device and the user equipment, and release a radio resource.

The wearable device releases the RRC connection between the wearable device and the user equipment, to save radio resources.

Optionally, the second receiver is further configured to receive a wearable device index sent by the user equipment. The wearable device index is obtained by configuring, by the user equipment, an index corresponding to the identifier information of the wearable device.

In a scenario in which the wearable device is connected to the base station by using the user equipment, an RRC connection is established between the user equipment and the base station, and an RRC connection is established between the wearable device and the user equipment, so that signaling transmission can be performed between the base station and the wearable device. The wearable device receives the second configuration information sent by the user equipment, and completes radio configuration according to an indication of the second configuration information, so that the wearable device can autonomously perform a related service.

A ninth aspect of the present invention provides user equipment. A communications system in the present invention includes a base station, a wearable device, and user equipment. Each user equipment can support one or more wearable devices, and the wearable device is connected to the base station by using the user equipment. The base station includes:

a third receiver, a third transmitter, a bus, a third processor, and a third memory.

The third receiver, the third transmitter, the third processor, and the third memory are all connected by using the bus.

The third receiver receives an RRC message sent by the user equipment. The RRC message carries identifier information used to identify the wearable device, and the RRC message is used to indicate that an RRC connection has been established between the wearable device and the user equipment.

The third transmitter sends the identifier information and first configuration information to the user equipment. The first configuration information is used to instruct the user equipment to perform radio configuration on a first interface and a second interface. The first interface is a communications interface between the user equipment and the base station, and the second interface is a communications interface between the user equipment and the wearable device.

Optionally, the third transmitter is further configured to send a first reconfiguration message to the user equipment. The first reconfiguration message carries the identifier information and first configuration information for establishing a data radio bearer DRB. The first configuration information for establishing a data radio bearer DRB is used to instruct the user equipment to perform DRB establishment resource configuration on the first interface and the second interface. Second configuration information for establishing a data radio bearer DRB is carried in a second reconfiguration message sent by the user equipment to the wearable device. The second configuration information for establishing a DRB is used by the wearable device to perform DRB establishment resource configuration, and is generated by the user equipment according to the first configuration information for establishing a DRB.

In a scenario in which the wearable device is connected to the base station by using the user equipment, an RRC connection is established between the base station and the user equipment, and an RRC connection is established between the wearable device and the user equipment, so that signaling transmission can be performed between the base station and the wearable device. The base station sends, by using the user equipment, the first configuration information for establishing a DRB to the wearable device, so that the user equipment performs DRB establishment resource configuration on the first interface and the second interface according to the first configuration information for establishing a DRB, the base station and the wearable device establish a communications channel, and the wearable device completes DRB establishment radio configuration according to an indication of the second configuration information.

Optionally, the third transmitter is further configured to send a third reconfiguration message to the user equipment. The third reconfiguration message carries the identifier information and first configuration information for modifying a DRB. The first configuration information for establishing a data radio bearer DRB is used to instruct the user equipment to perform DRB modification resource configuration on the first interface and the second interface. Second configuration information for modifying a DRB is carried in a fourth reconfiguration message sent by the user equipment to the wearable device. The second configuration information for modifying a DRB is used by the wearable device to perform DRB modification resource configuration, and is generated by the user equipment according to the first configuration information for modifying a DRB.

The base station sends, by using the user equipment, the first configuration information for modifying a DRB to the wearable device, so that the user equipment performs DRB modification resource configuration on the first interface and the second interface according to the first configuration information for modifying a DRB, the wearable device and the base station establish a communications channel, and the wearable device completes DRB modification radio configuration according to an indication of the second configuration information.

Optionally, the third transmitter is further configured to send a fifth reconfiguration message to the user equipment. The fifth reconfiguration message carries the identifier information and first configuration information for releasing a DRB. The first configuration information for releasing a DRB is used to instruct the user equipment to perform DRB release resource configuration on the first interface and the second interface. Second configuration information for releasing a DRB is carried in a sixth reconfiguration message sent by the user equipment to the wearable device. The second configuration information for releasing a DRB is used by the wearable device to perform DRB release resource configuration, and is generated by the user equipment according to the first configuration information for releasing a DRB.

The base station sends, by using the user equipment, the first configuration information for releasing a DRB to the wearable device, so that the user equipment performs DRB release resource configuration on the first interface and the second interface according to the first configuration information for releasing a DRB, the wearable device and the base station establish a communications channel, and the wearable device completes DRB release radio configuration according to an indication of the second configuration information for releasing a DRB.

Optionally, the third transmitter is further configured to send a seventh reconfiguration message to the user equipment. The seventh reconfiguration message carries the identifier information and first configuration information for establishing a signaling radio bearer. The first configuration information for establishing a signaling radio bearer is used to instruct to establish a signaling radio bearer for transmitting a non-access stratum NAS message, and is used to instruct the user equipment to perform signaling radio bearer establishment resource configuration on the first interface and the second interface. Second configuration information for establishing a signaling radio bearer is carried in an eighth reconfiguration message sent by the user equipment to the wearable device. The second configuration information for establishing a signaling radio bearer is used by the wearable device to perform signaling radio bearer establishment resource configuration, and is generated by the user equipment according to the first configuration information for establishing a signaling radio bearer.

Optionally, the third receiver is configured to receive a second connection release message sent by the user equipment. The second RRC connection release message carries the identifier information of the wearable device.

The third processor is configured to delete, according to the second RRC connection release message received by the third receiving module, context information of the wearable device corresponding to the identifier information. The context information of the wearable device is created by the base station according to the identifier information.

In a scenario in which the wearable device is connected to the base station by using the user equipment, an RRC connection is established between the user equipment and the base station, and an RRC connection is established between the wearable device and the user equipment, so that signaling transmission can be performed between the base station and the wearable device. The base station sends the first configuration information to the user equipment. The first configuration information is used to instruct the user equipment to configure the first interface and the second interface according to the first configuration information, so that a communications channel is established between the wearable device and the base station, and data transmission can be performed between the base station and the wearable device.

DESCRIPTION OF EMBODIMENTS

Figure 1:
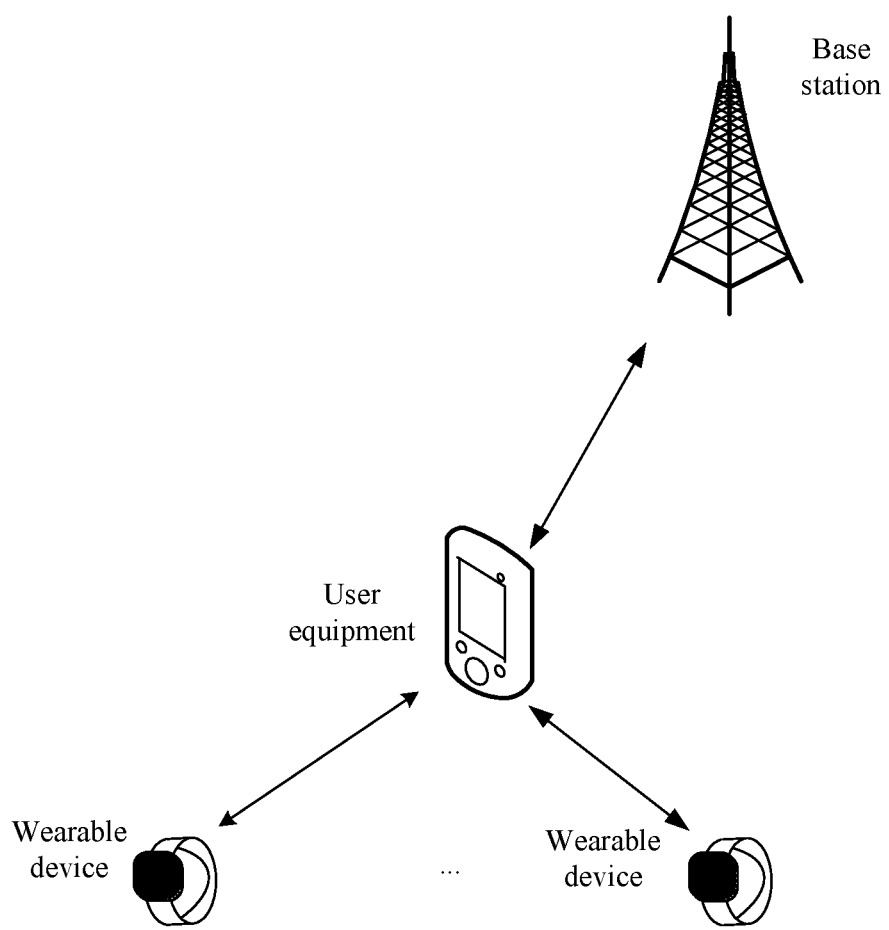
FIG. 1 is a schematic diagram of a communications system according to an embodiment of the present invention.

The embodiments of the present invention provide a radio configuration method for a wearable device, a related device, and a base station, to perform radio configuration on the wearable device that is connected to the base station by using relay user equipment.

To make a person skilled in the art understand the technical solutions in the present invention better, the following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

In the specification, claims, and accompanying drawings of the present invention, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of the present invention described herein can be implemented in other orders than the order illustrated or described herein. Moreover, the terms "include", "contain", and any other variants mean to cover the non-exclusive inclusion, for example, a process, method, system, product, or device that includes a list of steps or units is not necessarily limited to those units, but may include other units not expressly listed or inherent to such a process, method, system, product, or device.

In the embodiments of the present invention, a communications system in the embodiments of the present invention includes a base station, a wearable device (Wearable Device, WD), and user equipment (User equipment, UE). Each user equipment can support one or more wearable devices, and each wearable device is connected to the base station by using the user equipment. For a schematic diagram of the communications system, refer to FIG. 1.

In an existing solution, a wearable device pairs with user equipment by using Bluetooth or WiFi, and is connected to a network by using the user equipment. A base station configures only relay user equipment related signaling and services. The wearable device only reflects the relay user equipment service, and cannot autonomously perform a service. In addition, the base station cannot recognize an identifier of the wearable device, perform addressing on the wearable device independently, or perform radio configuration on the wearable device.

In the embodiments of the present invention, the user equipment and the base station establish an RRC (Radio Resource Control, radio resource control) connection. The user equipment receives an RRC connection request sent by the wearable device, where the RRC connection request carries identifier information of the wearable device. The user equipment and the wearable device establish an RRC connection. The user equipment sends an RRC message to the base station, to inform the base station that an RRC connection has been established between the wearable device and the user equipment. The RRC message carries the identifier information used to identify the wearable device. When the user equipment receives first configuration information, sent by the base station, used for configuring the wearable device, and the first configuration information is corresponding to the identifier information, the user equipment can determine a wearable device corresponding to the first configuration information. The user equipment performs radio configuration on a communications interface between the user equipment and the base station and a communications interface between the user equipment and the wearable device according to an indication of the first configuration information. The user equipment sends second configuration information to the wearable device. The second configuration information is used by the wearable device to perform radio configuration, so that the wearable device and the base station can perform signaling and service data transmission, and the wearable device can autonomously perform a service.

Figure 2:
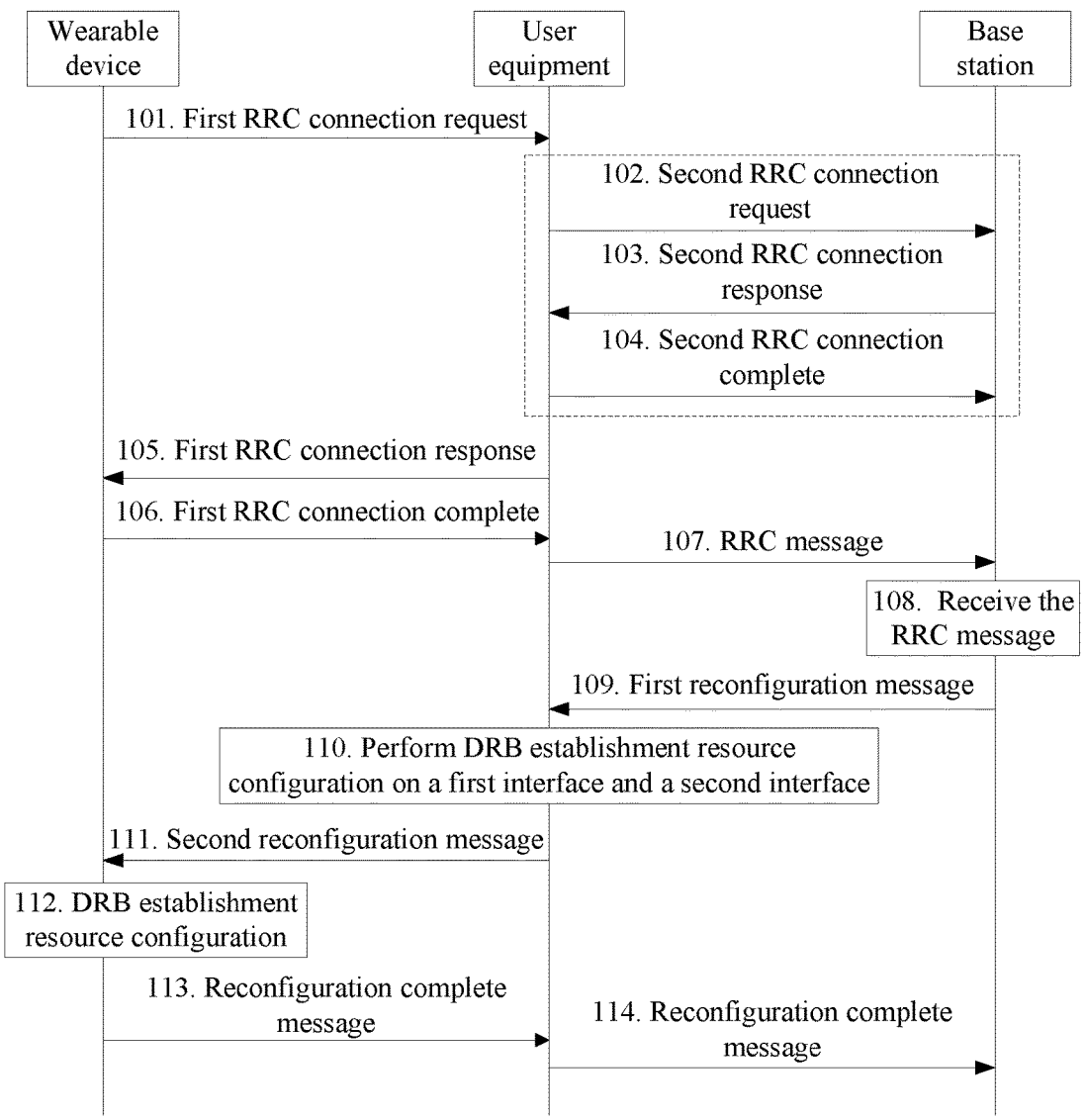
FIG. 2 is a schematic diagram of an embodiment of a radio configuration method for a wearable device according to the embodiments of the present invention.

For ease of understanding, a specific procedure in this embodiment of the present invention is described below. Based on different content of the first configuration information sent by the base station and received by the user equipment, the embodiments of the present invention are described separately. Referring to FIG. 2, an embodiment of a radio configuration method for a wearable device according to the embodiments of the present invention includes the following steps.

101. A wearable device sends a first RRC connection request to user equipment.

The first RRC connection request carries identifier information of the wearable device. The wearable device first sends the first RRC connection request over a first signaling radio bearer SRB0 by default. The default first SRB0 is configured by the wearable device and the user equipment in advance.

102. The user equipment receives the first RRC connection request, and sends a second RRC connection request to a base station, where the user equipment sends the first RRC connection message over a default second SRB0.

103. The base station receives the second RRC connection request, and sends a second RRC connection response to the user equipment.

The base station sends the second RRC connection response to the user equipment. The second RRC connection response carries entire first configuration information used for an SRB1.

104. The user equipment receives the second RRC connection response, and sends a second RRC connection complete message to the base station.

When the base station receives the second RRC connection complete message sent by the base station, the base station creates and stores context information of the UE. The second RRC connection complete message is used to inform the base station that the user equipment has established an RRC connection with the base station.

It should be noted that, step 102 to step 104 are a process of establishing an RRC connection by the user equipment and the base station, and are optional steps. When the user equipment receives the first RRC connection request sent by the wearable device, the user equipment may be in an RRC idle state or an RRC connected state. If the user equipment is in an RRC idle state, step 102 to step 104 need to be performed, that is, the user equipment and the base station need to establish an RRC connection. If the user equipment is in an RRC connected state, that is, the user equipment and the base station have established an RRC connection, step 102 to step 104 do not need to be performed, and step 105 is performed.

105. The user equipment receives the first RRC connection request sent by the wearable device, and sends a first RRC connection response to the wearable device according to the RRC connection request.

The user equipment receives the first RRC connection request sent by the wearable device. The first RRC connection request carries the identifier information of the wearable device. The wearable device can support multiple (two or more) wearable devices. Therefore, the user equipment may determine, by using the identifier information of the wearable device, a message sent to the user equipment and a message sent to the wearable device, and determine a particular wearable device to which a message is sent.

Preferably, when the user equipment receives a first RRC connection message sent by the wearable device, and obtains the identifier information of the wearable device, the user equipment configures, for the wearable device, a wearable device index corresponding to the identifier information of the wearable device to obtain the wearable device index, and sends the wearable device index to the wearable device. The wearable device index is used to identify the wearable device or a message sent by the wearable device. The user equipment may add the index to a message sent to the wearable device, or may send the index alone, and a specific method is not limited herein. For a method for creating a wearable device index, the user equipment may establish a correspondence between the identifier information and an internal index of the user equipment, or may generate a corresponding index according to the identifier information, and a specific method is not limited herein. In a message, bits used to carry the wearable device index are less than bits used to carry the identifier information; therefore, using a wearable device index can effectively reduce signaling overheads. The wearable device index is also used to identify the wearable device. Therefore, after this step, the identifier information of the wearable device may also be the wearable device index, and details are not repeated below.

It should be noted that, the user equipment includes a first interface and a second interface. The first interface may also be referred to as a Uu interface, and the second interface may also be referred to as a WD-UE interface, a communications interface between the user equipment and the wearable device. The user equipment establishes a signaling radio bearer SRB1 for the WD-UE interface according to the first RRC connection. Establishing the signaling radio bearer SRB1 includes establishing a channel for Bluetooth BT communication, and configuring an RLC entity and/or a PDCP entity.

Figure 3:
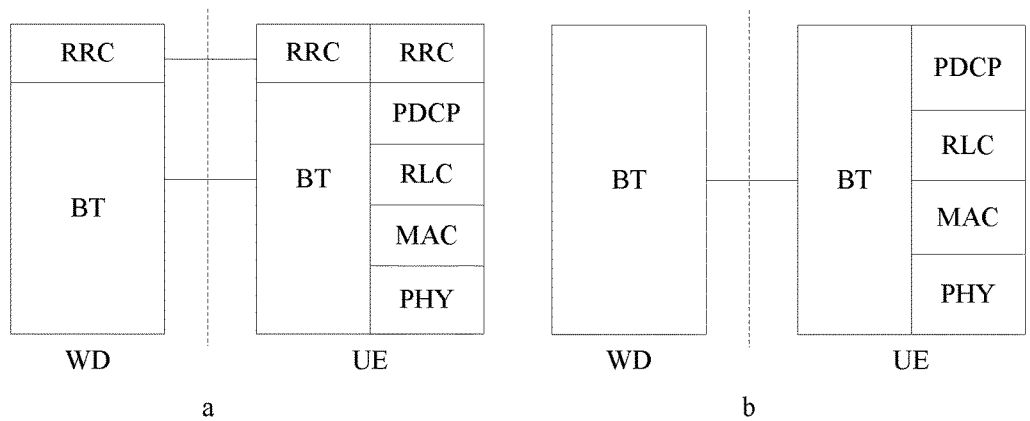
FIG. 3 is a schematic diagram of a second interface protocol model according to an embodiment of the present invention.

It should be noted that, a link between the wearable device and the user equipment may be based on BT (Bluetooth, Bluetooth), WiFi (WIreless-Fidelity, wireless fidelity), or other non-LTE (Long Term Evolution, Long Term Evolution in universal mobile telecommunication technologies) transport layer protocols. In this embodiment, Bluetooth is used as an example to describe a specific manner of configuring an RLC entity and/or a PDCP entity, and the specific manner is to determine whether a WD-UE interface protocol stack includes a PDCP (Packet Data Convergence Protocol, Packet Data Convergence Protocol) layer and an RLC (Radio Link Control, Radio Link Control) layer. A WD-UE interface protocol model has the following three types:

Referring to FIG. 3, FIG. 3 shows a first protocol model. In FIG. 3, FIG. a is a control-plane model, and FIG. b is a user-plane model. In the control-plane model of the first protocol model, the WD-UE interface protocol stack does not have an LTE data link layer (L2 layer); therefore, only a BT layer is configured in an RRC message exchange process. Over the WD-UE interface, an SRB0 message of the wearable device is transferred between an RRC layer and the BT layer by using default configuration inside the wearable device and inside the user equipment.

Figure 4:
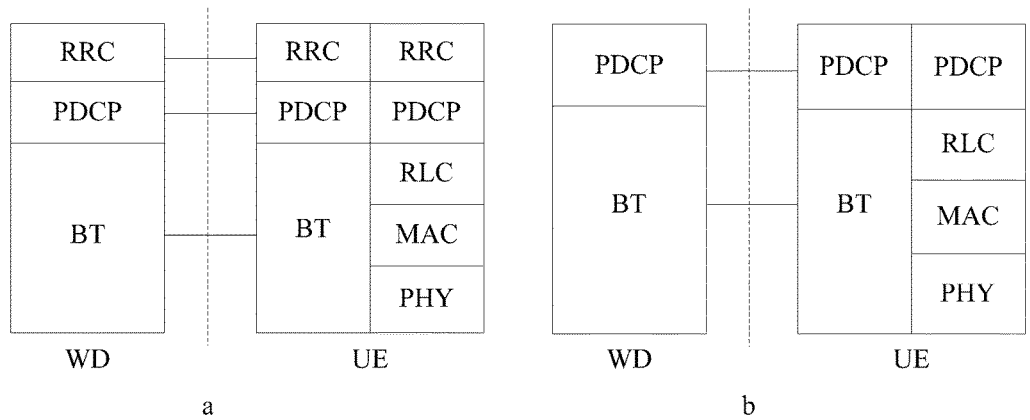
FIG. 4 is a schematic diagram of another second interface protocol model according to an embodiment of the present invention.

Referring to FIG. 4, FIG. 4 shows a second protocol model. In FIG. 4, FIG. a is a control-plane model, and FIG. b is a user-plane model. In the second protocol model, the WD-UE interface protocol stack includes an LTE PDCP layer. Therefore, a PDCP entity and a BT entity are configured in an RRC message exchange process. An SRB0 message of the wearable device is in a transparent mode, and therefore, is not processed at a PDCP layer. The SRB0 message of the wearable device is transferred between an RRC layer and a BT layer by using default configuration inside the wearable device and inside the user equipment. A data transmission manner of the WD is similar to the first protocol model, and the PDCP also participates in data transmission. Inside the user equipment, data is transferred in a PDCP PDU between a BT layer and a PDCP layer.

Figure 5:
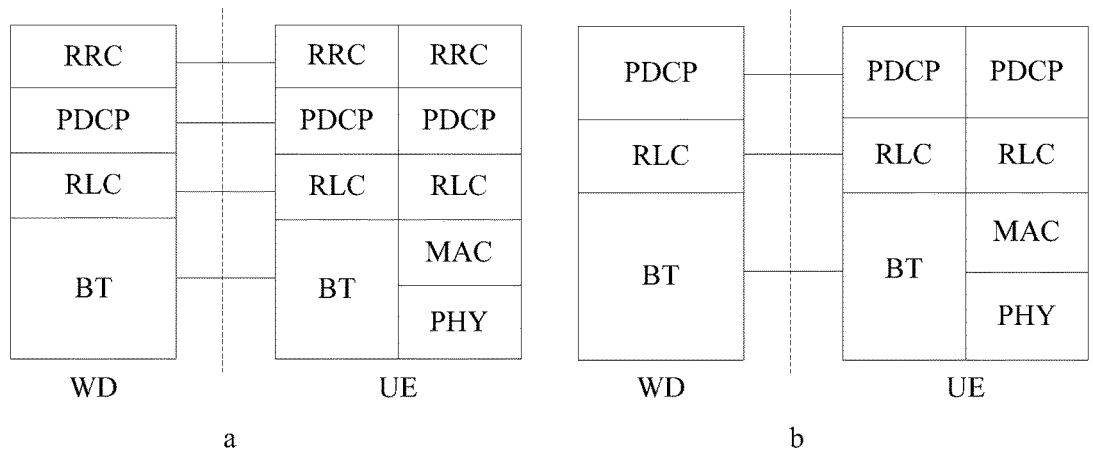
FIG. 5 is a schematic diagram of another second interface protocol model according to an embodiment of the present invention.

Referring to FIG. 5, FIG. 5 shows a third protocol model. In FIG. 5, FIG. a is a control-plane model, and FIG. b is a user-plane model. In the third protocol model, in this model, the WD-UE interface protocol stack includes an LTE PDCP layer and an RLC layer. Therefore, a PDCP entity, an RLC entity, and a BT entity are configured in an RRC exchange process. An SRB0 message of the wearable device is in a transparent mode, and therefore, is not processed at a PDCP layer. The SRB0 message of the wearable device is transferred between RRC, RLC, and BT by using default configuration inside the wearable device and inside the user equipment. In the third protocol model, the PDCP and the RLC participate in data transmission. Inside the user equipment, data is transferred in an RLC PDU between a BT layer and an RLC layer.

It should be noted that, WD-UE interface configurations in the following all are based on the protocol models in FIG. 3 to FIG. 5, and details are not repeated below. In this embodiment of the present invention, the first protocol model, the second protocol model, or the third protocol model is merely an example used to describe a principle. No specific limitation is set to a specific protocol model of the WD-UE interface in practical application. In this embodiment of the present invention, the third protocol model is used as an example to describe a WD-UE interface configuration.

The first interface may also be referred to as a Uu interface, that is, a communications interface between the user equipment and the base station. Over the Uu interface, an SRB1 message of the wearable device is transferred over an SRB1 allocated to the user equipment. That is, both the SRB1 message of the wearable device and an SRB1 message of the user equipment are transferred over the SRB1 allocated to the user equipment, and are distinguished by using the identifier information of the wearable device.

106. The wearable device receives the first RRC connection response sent by the user equipment, and sends a first RRC connection complete message to the user equipment.

It should be understood that, the wearable device configures an SRB1 according to an indication of the first RRC connection response. LTE configuration in the first RRC connection response may include only LTE layer configuration of the WD-UE. For details, refer to the WD-UE interface models in FIG. 3 to FIG. 5. For example, in the second protocol model, the WD-UE protocol stack includes a PDCP layer, and the first RRC connection response may include only related configuration of an RRC entity and a PDCP entity, and the SRB1 message of the WD is transferred between the RRC layer, the PDCP layer, and the BT layer by using channels inside the wearable device and the user equipment, where the channels are configured during RRC connection establishment.

After successfully establishing the SRB1, the wearable device returns the first RRC connection complete message to the relay user equipment. The first RRC connection complete message carries a wearable device ID of the wearable device, and may carry a non-access stratum NAS message.

107. The user equipment receives the first RRC connection complete message, and sends an RRC message to the base station.

The RRC message is used to indicate that an RRC connection has been established between the wearable device and the user equipment, and the RRC message includes the identifier information used to identify the wearable device and related information of the wearable device. It should be noted that, the related message of the wearable device includes connection information, bearer information, and the like of the wearable device.

108. The base station receives the RRC message.

When receiving the RRC message and determining that an RRC connection has been established between the wearable device and the user equipment, the base station creates, based on the related information of the wearable device in the RRC message, a context of the wearable device, and establishes an internal SRB1 for the wearable device.

Figure 6:
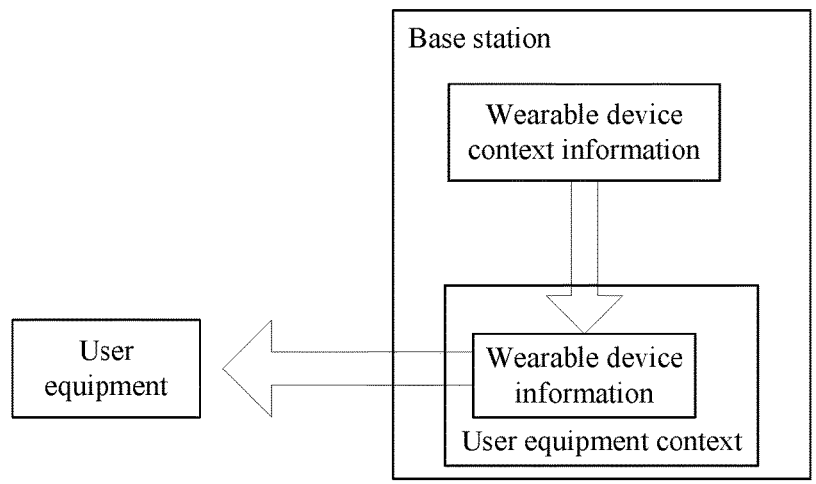
FIG. 6 is a schematic diagram of wearable device context information processing in a base station according to an embodiment of the present invention.

It should be noted that, when the base station needs to send an SRB1 message to the wearable device, because an SRB1 message to be sent to the wearable device needs to be first sent to the user equipment through the Uu interface of the user equipment, the base station needs to internally nests the context of the wearable device into a context of the user equipment, and sends, to the user equipment according to a context obtained by means of nesting, the SRB1 message to be sent to the wearable device. A process for processing the context of the wearable device is shown in FIG. 6.

109. The base station sends a first reconfiguration message to the user equipment.

The first reconfiguration message carries the identifier information and first configuration information for establishing a data radio bearer (Data Radio Bearer, DRB).

It should be noted that, a service request may be initiated by the wearable device or a server, and no limitation is set herein. If the service request is initiated by the wearable device, the wearable device sends the service request to the user equipment, the base station sends, to an MME (Mobility Management Entity, mobility management entity) of a core network, the service request (a NAS message) sent by the user equipment, and the MME sends a message to the base station according to the service request. The message includes related information such as information for establishing a service bearer. The base station receives the message, and sends the first reconfiguration message to the user equipment. The first reconfiguration message carries the identifier information and the first configuration information for establishing a data radio bearer DRB.

If the service request is initiated by the server, the server sends the service request to an MME, and the MME sends a message to the base station according to the service request. The message carries the first configuration information. The base station receives the message sent by the MME, and sends the first reconfiguration message to the user equipment. The user equipment may learn, according to the identifier information, that the first reconfiguration message is a message sent to the wearable device.

110. The user equipment receives the first reconfiguration message, and performs, according to first configuration information for establishing a DRB and identifier information, DRB establishment resource configuration on a first interface and a second interface.

A specific method includes:

establishing, by the user equipment, a first DRB for the first interface (Uu) interface, and establishing a second DRB for the second interface (WD-UE) interface, where establishing the second DRB includes establishing a channel for communicating with BT, and configuring an RLC entity and a PDCP entity. For example, referring to the third protocol model shown in FIG. 5, the WD-UE protocol stack includes the PDCP layer and the RLC layer.

The user equipment establishes a route between LTE physical and data link layers (L1/L2), and a route between the BT and the data link layer (BT/L2) inside the user equipment, for transmitting DRB data between the wearable device and the base station. Each DRB is corresponding to one service.

111. The user equipment sends a second reconfiguration message to the wearable device.

The second reconfiguration message carries second configuration information for establishing a DRB. The first configuration information for establishing a DRB is used by the wearable device to perform DRB establishment resource configuration. It should be noted that, the second reconfiguration information is generated by the user equipment according to the first configuration information. The user equipment performs resource configuration on the first interface according to the first configuration information, correspondingly performs resource configuration on the second interface according to a resource configuration status corresponding to the first interface, and generates the second configuration information according to a resource configuration status corresponding to the second interface.

It should be noted that, because protocol stacks of the Uu interface and the WD-UE interface may be different, the first reconfiguration message and the second reconfiguration message may be different, that is, the first configuration information and the second configuration information may be different. Alternatively, because protocol stacks of the Uu interface and the WD-UE interface may be the same, the first reconfiguration message and the second reconfiguration message may be the same, that is, the first configuration information and the second configuration information may be the same.

Descriptions of the first configuration information and the second configuration information below are the same as those above, and details are not repeated below.

112. The wearable device receives the second reconfiguration message, and performs radio configuration according to second configuration information for establishing a DRB.

The wearable device receives the second reconfiguration message, and performs DRB establishment resource configuration according to an indication of the second configuration information for establishing a DRB carried in the second reconfiguration message.

113. The wearable device sends a reconfiguration complete message to the user equipment.

When the wearable device successfully completes DRB establishment configuration, the wearable device sends the reconfiguration complete message to the user equipment. The reconfiguration complete message carries the identifier information, and is used to inform the user equipment that the wearable device corresponding to the identifier information has completed DRB establishment resource configuration.

114. The user equipment receives the reconfiguration complete message, and sends the reconfiguration complete message to the base station.

The reconfiguration complete message is used to inform the base station that the wearable device has completed radio configuration, and the reconfiguration complete message carries the identifier information. The base station maintains the context information of the wearable device according to the identifier information. The identifier information may be the identifier information of the wearable device or the wearable device index.

In this embodiment of the present invention, in a scenario in which the wearable device is connected to the base station by using the user equipment, the user equipment and the base station establish an RRC connection, the wearable device and the user equipment establish an RRC connection, and signaling transmission can be performed between the base station and the wearable device. The user equipment receives the first configuration information sent by the base station, and performs radio configuration on the first interface and the second interface according to an indication of the first configuration information. The user equipment generates the second configuration information according to the first configuration information, and sends the second configuration information to the wearable device, so that the wearable device performs radio configuration according to the second configuration information, the wearable device and the base station can perform service data transmission, and the wearable device can autonomously perform a related service.

Figure 7:
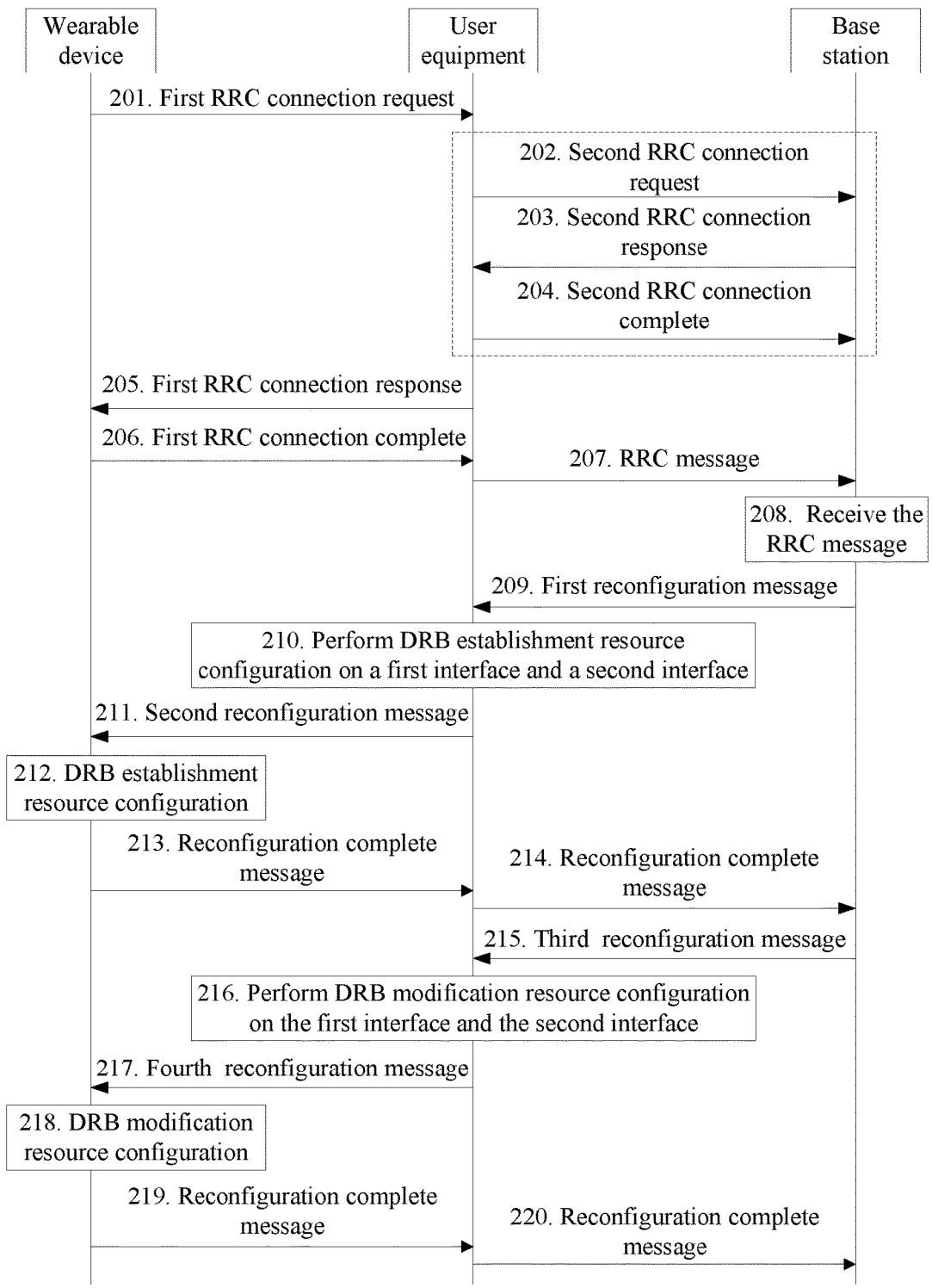
FIG. 7 is a schematic diagram of another embodiment of a radio configuration method for a wearable device according to the embodiments of the present invention.

Referring to FIG. 7, another embodiment of a radio configuration method for a wearable device according to the embodiments of the present invention includes the following steps.

In this embodiment, step 201 to step 214 are the same as step 101 to step 114 in the foregoing embodiment, and details are not repeated herein.

215. The base station sends a third reconfiguration message to the user equipment.

The third reconfiguration message carries the identifier information and first configuration information for modifying a DRB. The DRB may be one or more DRBs, and is not limited herein.

216. The user equipment receives the third reconfiguration message sent by the base station, and performs DRB modification resource configuration on the first interface and the second interface according to first configuration information for modifying a DRB and the identifier information.

A specific method includes: for the Uu interface, modifying, by the user equipment, a corresponding DRB indicated in the first configuration information; and for the WD-UE interface, modifying, by the user equipment, a corresponding DRB indicated in the first configuration information, including configuring the channel for communicating with the BT, and configuring the RLC entity and the PDCP entity.

217. The user equipment sends a fourth reconfiguration message to the wearable device.

The fourth reconfiguration message carries second configuration information for modifying a DRB. The second configuration information for modifying a DRB is used by the wearable device to perform DRB modification resource configuration, and is generated by the user equipment according to the first configuration information for modifying a DRB.

218. The wearable device receives the fourth reconfiguration message, and performs DRB modification resource configuration.

The wearable device performs DRB modification resource configuration according to the second configuration information for modifying a DRB carried in the fourth reconfiguration message.

219. The wearable device sends a reconfiguration complete message to the user equipment.

When the wearable device successfully completes DRB modification configuration, the wearable device sends the reconfiguration complete message to the user equipment. The reconfiguration complete message carries the identifier information, and is used to inform the user equipment that the wearable device corresponding to the identifier information has completed DRB modification resource configuration.

220. The user equipment receives the reconfiguration complete message, and sends the reconfiguration complete message to the base station.

The reconfiguration complete message is used to inform the base station that the wearable device has completed radio bearer modification resource configuration, and the reconfiguration complete message carries the identifier information. The base station maintains the context information of the wearable device according to the identifier information. The identifier information may be the identifier information of the wearable device or a wearable device index.

In this embodiment of the present invention, in a scenario in which the wearable device is connected to the base station by using the user equipment, the user equipment and the base station establish an RRC connection, the wearable device and the user equipment establish an RRC connection, and signaling transmission can be performed between the base station and the wearable device. The user equipment receives the first configuration information for modifying a DRB sent by the base station, and performs radio configuration on the first interface and the second interface according to an indication of the first configuration information for modifying a DRB. The user equipment generates the second configuration information according to the first configuration information for modifying a DRB, and sends the second configuration information for modifying a DRB to the wearable device, so that the wearable device performs radio configuration according to the second configuration information for modifying a DRB, and the wearable device and the base station can perform service data transmission. Each DRB is corresponding to one service, and the wearable device can perform a service corresponding to a modified DRB.

Figure 8:
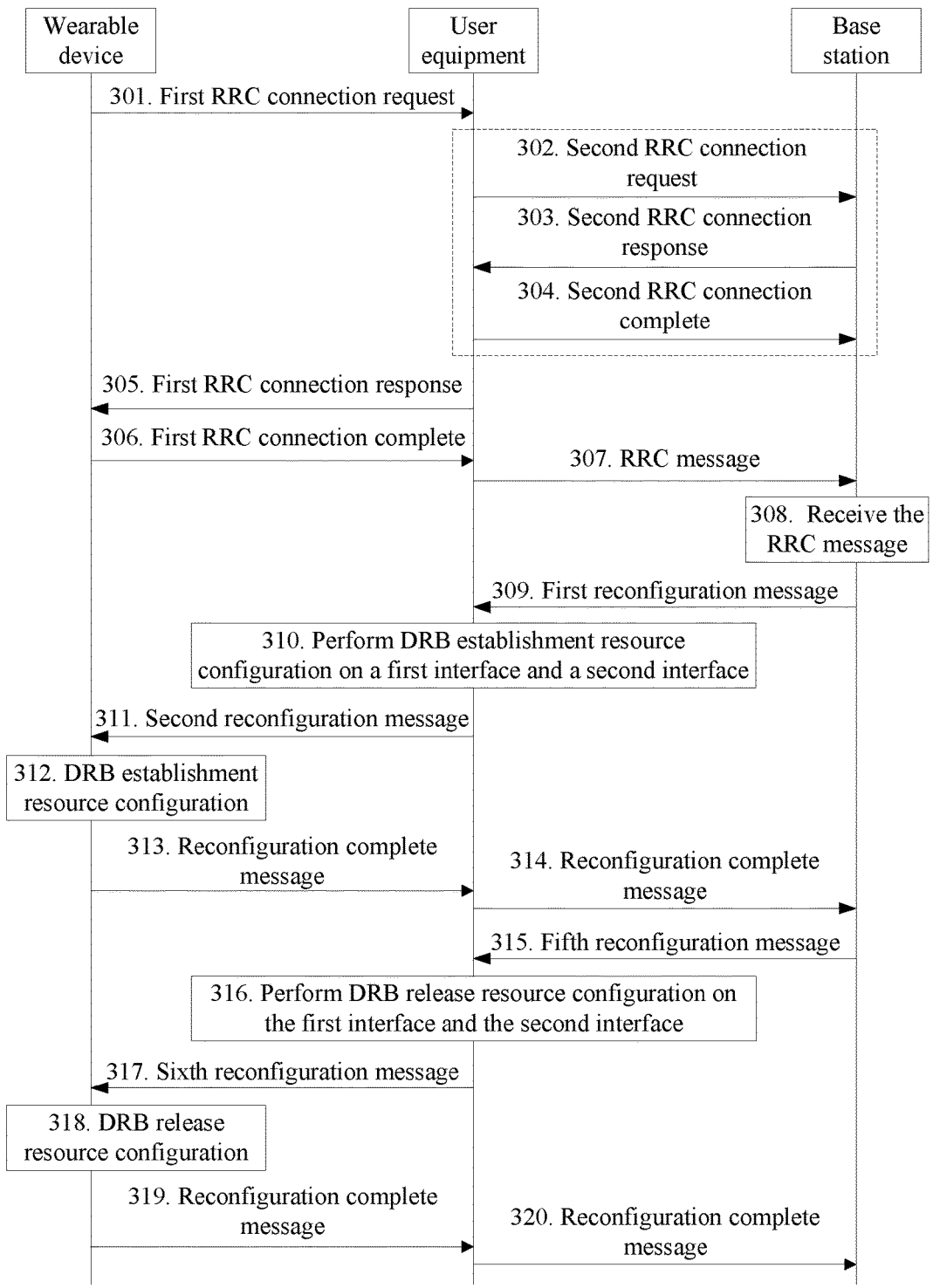
FIG. 8 is a schematic diagram of another embodiment of a radio configuration method for a wearable device according to the embodiments of the present invention.

Referring to FIG. 8, another embodiment of a radio configuration method for a wearable device according to the embodiments of the present invention includes the following steps.

In this embodiment, step 301 to step 314 are the same as step 101 to step 114 in the foregoing embodiment, and details are not repeated herein.

315. The base station sends a fifth reconfiguration message to the user equipment.

The fifth reconfiguration message carries the identifier information and first configuration information for releasing a DRB.

316. The user equipment receives the fifth reconfiguration message sent by the base station, where the fifth reconfiguration message carries the identifier information and first configuration information for releasing a DRB; and performs DRB release resource configuration on the first interface and the second interface according to the first configuration information for releasing a DRB and the identifier information.

A specific method used by the user equipment to perform internal configuration includes:

for configuration of the Uu interface: releasing, by the user equipment, a corresponding DRB indicated in the first configuration information; and for configuration of the WD-UE interface: releasing, by the user equipment, the corresponding DRB indicated in the first configuration information, including releasing the channel for communicating with the BT, the RLC entity, and the PDCP entity.

317. The user equipment sends a sixth reconfiguration message to the wearable device.

The sixth reconfiguration message carries second configuration information for releasing a DRB. The wearable device performs DRB release resource configuration according to the second configuration information for releasing a DRB. The second configuration information for releasing a DRB is generated by the user equipment according to the first configuration information for releasing a DRB.

318. The wearable device receives the sixth reconfiguration message, and performs DRB release resource configuration.

The wearable device performs DRB release resource configuration according to the second configuration information for releasing a DRB carried in the sixth reconfiguration message.

319. The wearable device sends a reconfiguration complete message to the user equipment.

When the wearable device successfully completes DRB release configuration, the wearable device sends the reconfiguration complete message to the user equipment. The reconfiguration complete message carries the identifier information, and is used to inform the user equipment that the wearable device corresponding to the identifier information has completed DRB release resource configuration.

320. The user equipment receives the reconfiguration complete message, and sends the reconfiguration complete message to the base station.

The reconfiguration complete message is used to inform the base station that the wearable device has completed radio bearer establishment resource configuration, and the reconfiguration complete message carries the identifier information. The base station maintains the context information of the wearable device according to the identifier information. The identifier information may be the identifier information of the wearable device or a wearable device index.

In this embodiment of the present invention, in a scenario in which the wearable device is connected to the base station by using the user equipment, the user equipment and the base station establish an RRC connection, the wearable device and the user equipment establish an RRC connection, and signaling transmission can be performed between the base station and the wearable device. The user equipment receives the first configuration information for releasing a DRB sent by the base station, and performs radio configuration on the first interface and the second interface according to an indication of the first configuration information for releasing a DRB. The user equipment generates the second configuration information according to the first configuration information for releasing a DRB, and sends the second configuration information for releasing a DRB to the wearable device, so that the wearable device performs radio configuration according to the second configuration information for releasing a DRB, and the wearable device and the base station can perform DRB release radio configuration, to save radio resources.

Figure 9:
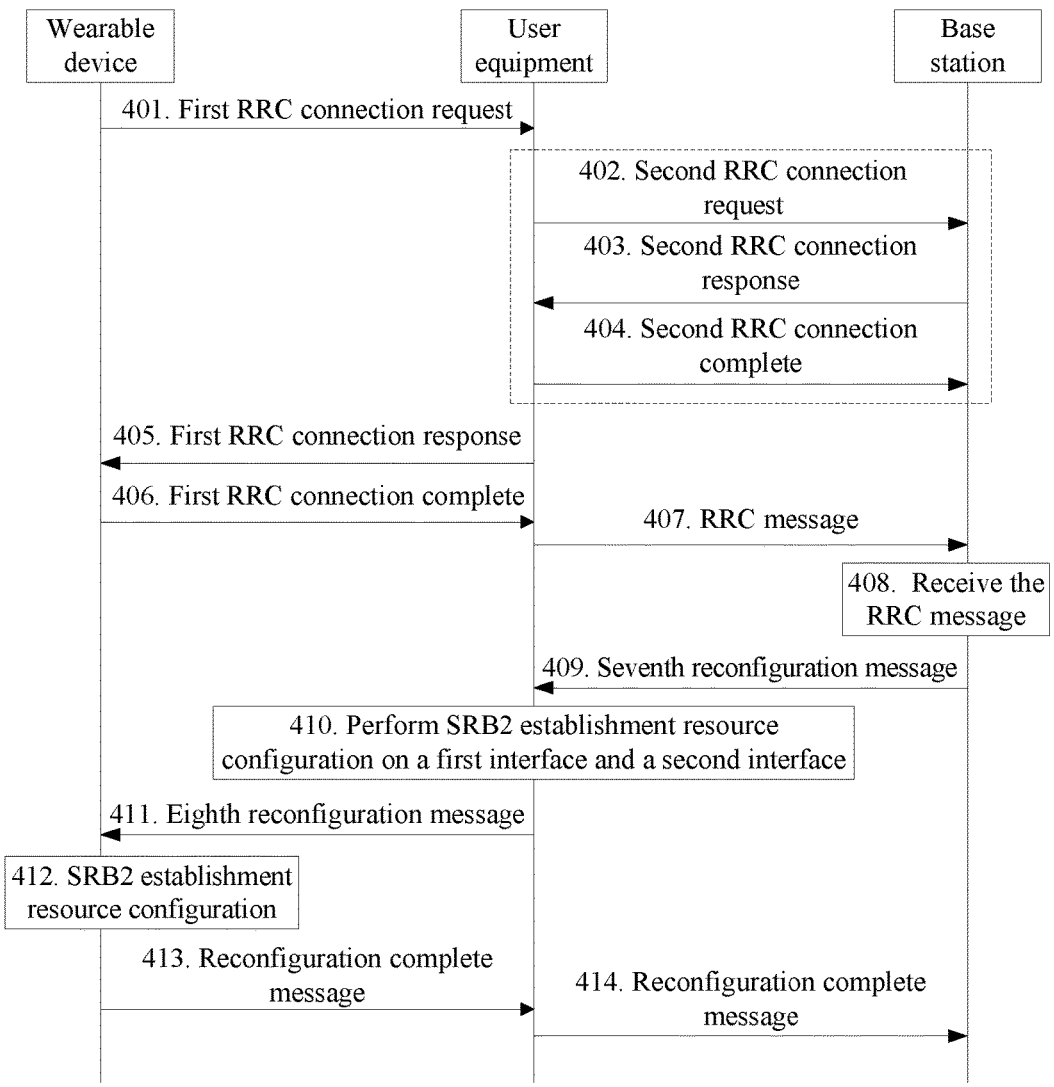
FIG. 9 is a schematic diagram of another embodiment of a radio configuration method for a wearable device according to the embodiments of the present invention.

Referring to FIG. 9, another embodiment of a radio configuration method for a wearable device according to the embodiments of the present invention includes the following steps.

Step 401 to step 408 are the same as step 101 to step 108 in the embodiment corresponding to FIG. 1, and details are not repeated herein.

409. The base station sends a seventh reconfiguration message to the user equipment.

When the base station determines to establish an SRB2 for the wearable device, the base station creates the SRB2 in the context of the wearable device corresponding to an indicated identifier.

The base station sends the seventh reconfiguration message to the user equipment. The seventh reconfiguration message carries the identifier information and first configuration information for establishing a signaling radio bearer SRB2. The first configuration information for establishing a signaling radio bearer is used to instruct to establish a signaling radio bearer SRB2 for transmitting a non-access stratum NAS message. After the SRB2 is established to transmit the NAS message, the base station does not need to perform parsing processing, but transmits the NAS message to the user equipment, reducing processing load of the base station.

410. The user equipment receives the seventh reconfiguration message, and performs, according to first configuration information for establishing a signaling radio bearer SRB2 and identifier information, DRB establishment resource configuration on a first interface and a second interface.

The first interface is also referred to as a Uu interface, and is a communications interface between the user equipment and the base station. The second interface may also be referred to as a WD-UE interface, and is a communications interface between the user equipment and the wearable device.

A specific method includes a specific configuration process of the Uu interface and the WD-UE interface.

Configuration of the Uu interface may include multiple methods. Three methods are used as examples for description.

Method 1: An existing SRB2 channel of the Uu interface is modified, so that the SRB2 channel is also used to transmit an SRB2 message of the wearable device. The identifier information is used to distinguish between an SRB2 message of the user equipment and the SRB2 message of the wearable device.

Method 2: A new SRB, which may be referred to as an SRB3, is established. The SRB3 is used to transfer an SRB2 message of the wearable device.

Method 3: A new DRB is established to transfer an SRB2 message of the wearable device.

A specific configuration process of the WD-UE interface is as follows: The user equipment establishes an SRB2 between the user equipment and the wearable device, including establishing a channel for communicating with BT, and configuring an RLC entity and a PDCP entity; and the user equipment establishes routes between LTE L1/L2 and between BT/L2 inside the user equipment, to transfer an SRB2 message between the user equipment and the wearable device.

It should be noted that, the foregoing three methods are merely examples for description and not for limitation. Methods that are essentially the same as the foregoing methods shall all fall within the coverage scope of the present invention.

411. The user equipment sends an eighth reconfiguration message to the wearable device.

The eighth reconfiguration message carries second configuration information for establishing an SRB2. The second configuration information for establishing an SRB2 is used by the wearable device to perform signaling radio bearer establishment resource configuration, and is generated by the user equipment according to the first configuration information for establishing an SRB2.

It should be noted that, because protocol stacks of the Uu interface and the WD-UE interface may be different, the seventh reconfiguration message and the eighth reconfiguration message may be different.

412. The wearable device receives the eighth reconfiguration message.

The wearable device receives the eighth reconfiguration message, and performs radio configuration according to the second configuration information for establishing an SRB2 carried in the eighth reconfiguration message.

413. The wearable device sends a reconfiguration complete message to the user equipment.

When the wearable device successfully completes SRB2 establishment configuration, the wearable device sends the reconfiguration complete message to the user equipment. The reconfiguration complete message carries the identifier information, and is used to inform the user equipment that the wearable device corresponding to the identifier information has completed SRB2 establishment resource configuration.

414. The user equipment receives the reconfiguration complete message, and sends the reconfiguration complete message to the base station.

The reconfiguration complete message is used to inform the base station that the wearable device has completed SRB2 establishment resource configuration, and the reconfiguration complete message carries the identifier information. The base station maintains a context of the wearable device according to the identifier information. In the base station, the SRB2 message corresponding to the wearable device also needs to be processed by using a context of the user equipment before routing. For details, refer to FIG. 6.

Based on the foregoing embodiment, optionally, a process of releasing an RRC connection between the user equipment and the wearable device may be included. If in a preset period of time, the user equipment does not receive data sent by the wearable device, or the user equipment does not receive data that needs to be sent by the base station to the wearable device by using the user equipment, the user equipment may release the RRC connection between the user equipment and the wearable device, to reduce radio resource overheads.

The process for releasing an RRC connection between the user equipment and the wearable device is specifically as follows.

The user equipment sends a first RRC connection release message to the wearable device. The RRC connection release message carries the identifier information. The user equipment releases a radio resource allocated to the wearable device indicated by the identifier information. It should be noted that, for the Uu interface of the user equipment, the user equipment releases all radio configurations of the wearable device. For the WD-UE interface of the user equipment, the user equipment releases an SRB1/SRB2/DRB channel for communicating with BT, an RLC entity, and a PDCP entity. It should be noted that, that the user equipment releases an SRB1/SRB2/DRB channel for communicating with BT is corresponding to an SRB1/SRB2/DRB channel establishment process in the foregoing embodiment. For example, SRB1 and DRB channels are established in the embodiment corresponding to FIG. 1, and in this embodiment, the user equipment may release the SRB1 and DRB channels. This the same as the case in which a user releases the SRB1/SRB2/DRB channel for communicating with BT, and details are not repeated below.

The wearable device receives the first RRC connection release message, releases, according to the first RRC connection release message, the RRC connection between the wearable device and the user equipment, and releases radio configuration of the wearable device, including releasing an SRB1/SRB2/DRB channel for communicating with BT, an RLC entity, and a PDCP entity.

The user equipment sends a second RRC connection release message to the base station. The second RRC connection release message carries the identifier information, and is used to inform the base station that an RRC connection indicated by the identifier information has been released.

The base station receives the second RRC connection release message, and releases, according to the second RRC connection release message, context information of the wearable device corresponding to the identifier information.

Figure 10:
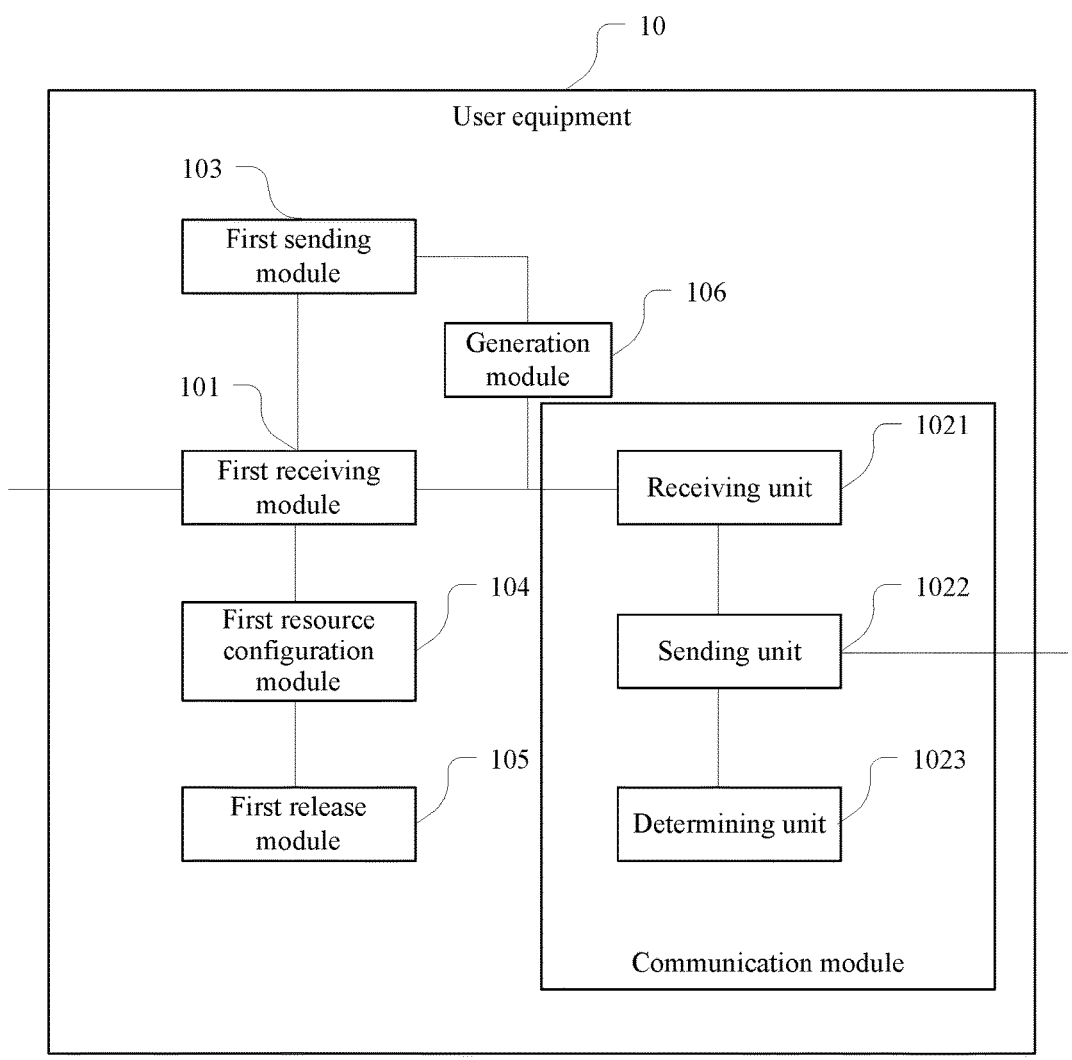
FIG. 10 is a schematic diagram of an embodiment of user equipment according to the embodiments of the present invention.

The radio configuration method for a wearable device in the embodiments of the present invention is described above, and a network device in the embodiments of the present invention is described below. Referring to FIG. 10, an embodiment of user equipment 10 in the embodiments of the present invention includes a first receiving module 101, a communication module 102, a first sending module 103, a first resource configuration module 104, a first release module 105, and a generation module 106.

The first receiving module 101 receives an RRC connection request sent by a wearable device. The RRC connection request carries identifier information of the wearable device.

The wearable device can support multiple (two or more) wearable devices. Therefore, the user equipment may determine, by using the identifier information received by the first receiving module, a message sent to the user equipment and a message sent to the wearable device, and determine a particular wearable device to which a message is sent.

The communication module 102 establishes an RRC connection with the wearable device according to the RRC connection request received by the first receiving module 101.

The communication module 102 specifically includes:
a receiving unit 1021, configured to receive the RRC connection request sent by the wearable device;
a sending unit 1022, configured to send an RRC connection response to the wearable device according to the RRC connection request received by the receiving unit 201, where
the receiving unit 1021 is further configured to receive an RRC connection complete message sent by the wearable device, where the RRC connection complete message is generated by the wearable device according to the RRC connection response; and
a determining unit 1023, configured to determine, according to the RRC connection complete message received by the receiving unit 201, that an RRC connection has been established between the user equipment and the wearable device.

The first sending module 103 sends an RRC connection establishment complete message to a base station. The RRC message is used to indicate that an RRC connection has been established between the wearable device and the user equipment, and the RRC message includes the identifier information used to identify the wearable device.

The first receiving module 101 receives the identifier information and first configuration information that are sent by the base station.

The first resource configuration module 104 performs radio configuration on a first interface and a second interface according to the configuration information and the identifier information that are received by the first receiving module 101.

The first interface is a communications interface between the user equipment and the base station, and the second interface is a communications interface between the user equipment and the wearable device.

The generation module 106 is configured to generate second configuration information according to the first configuration information received by the first receiving module 101.

The first sending module 103 is further configured to send the second configuration information to the wearable device. The configuration information is used by the wearable device to perform radio configuration.

Optionally, the first receiving module 101 is further configured to receive a first reconfiguration message sent by the base station. The first reconfiguration message carries the identifier information and configuration information for establishing a data radio bearer DRB.

The first resource configuration module 104 is further configured to perform DRB establishment resource configuration on the first interface and the second interface according to the first configuration information for establishing a DRB and the identifier information that are received by the first receiving module.

The first sending module 103 is further configured to send a second reconfiguration message to the wearable device. The second reconfiguration message carries configuration information for establishing a DRB, and the configuration information for establishing a DRB is used by the wearable device to perform DRB establishment resource configuration.

The first receiving module 101 is further configured to receive a reconfiguration complete message sent by the wearable device.

The first sending module 103 is further configured to send the reconfiguration complete message to the base station according to the reconfiguration complete message received by the first receiving module 101. The reconfiguration complete message is used to inform the base station that the wearable device has completed radio configuration, and the reconfiguration complete message carries the identifier information.

In this embodiment, the user equipment receives the first configuration information that is corresponding to the wearable device and that is sent by the base station, and the first resource configuration module configures the first interface and the second interface of the user equipment according to an indication of the first configuration information, so that the wearable device and the base station can perform service data transmission. The user equipment sends the second configuration information for establishing a DRB to the wearable device, so that the wearable device can complete DRB establishment radio configuration according to an indication of the second configuration information, and the wearable device can autonomously perform a related service.

Optionally, the first sending module 103 is further configured to send a first RRC connection release message to the wearable device. The RRC connection release message carries the identifier information.

The first release module 105 is configured to release a radio resource that is configured by the first resource configuration module 104 for the wearable device indicated by the identifier information.

The first sending module 103 is further configured to send a second RRC connection release message to the base station. The second RRC connection release message carries the identifier information, and is used to inform the base station that an RRC connection indicated by the identifier information has been released.

Based on the foregoing embodiment, if in a preset period of time, the first receiving module does not receive data sent by the wearable device, or the first receiving module does not receive data that the base station needs to send to the wearable device by using the user equipment, optionally, the first RRC release message may be sent to the wearable device by using the sending module. The first release module may release the RRC connection between the user equipment and the wearable device, to reduce radio resource overheads.

Based on the embodiment corresponding to FIG. 10, referring to FIG. 10, another embodiment of the user equipment in the embodiments of the present invention includes:

The first receiving module 101 is further configured to receive a third reconfiguration message sent by the base station. The third reconfiguration message carries the identifier information and first configuration information for modifying a DRB.

The first resource configuration module 104 is further configured to perform DRB modification resource configuration on the first interface and the second interface according to the first configuration information for modifying a DRB and the identifier information that are received by the first receiving module 101.

The first sending module 103 is further configured to send a fourth reconfiguration message to the wearable device. The fourth reconfiguration message carries second configuration information for modifying a DRB, and the second configuration information for modifying a DRB is used by the wearable device to perform DRB modification resource configuration.

On a basis that a DRB is established between the wearable device and the base station, the first sending module sends the first configuration information to the wearable device. The first resource configuration module completes DRB modification radio configuration on the first interface and the second interface according to an indication of the first configuration information. The user equipment generates, according to the first configuration information for modifying a DRB, the second configuration information for modifying a DRB, and sends the second configuration information to the wearable device, so that the wearable device can autonomously perform different services according to the second configuration information.

Based on the embodiment corresponding to FIG. 10, referring to FIG. 10, another embodiment of the user equipment in the embodiments of the present invention includes:

The first receiving module 101 is further configured to receive a fifth reconfiguration message sent by the base station. The fifth reconfiguration message carries the identifier information and first configuration information for releasing a DRB.

The first resource configuration module 104 is further configured to perform DRB release resource configuration on the first interface and the second interface according to the first configuration information for releasing a DRB and the identifier information that are received by the first receiving module 10.

The first sending module 103 is further configured to send a sixth reconfiguration message to the wearable device. The sixth reconfiguration message carries second configuration information for releasing a DRB, and the second configuration information for releasing a DRB is used by the wearable device to perform DRB release resource configuration.

In this embodiment, the user equipment sends the second configuration information to the wearable device by using the first sending module, so that the wearable device completes DRB release radio configuration according to an indication of the second configuration information, so as to save network radio resources.

Based on the embodiment corresponding to FIG. 10, referring to FIG. 10, another embodiment of the user equipment in the embodiments of the present invention includes:

Optionally, the first receiving module 101 is further configured to receive a seventh reconfiguration message sent by the base station. The seventh reconfiguration message carries the identifier information and first configuration information for establishing a signaling radio bearer. The first configuration information for establishing a signaling radio bearer is used to instruct to establish a signaling radio bearer for transmitting a non-access stratum NAS message.

The first resource configuration module 104 is further configured to perform signaling radio bearer SRB2 establishment resource configuration on the first interface and the second interface according to the first configuration information for establishing a signaling radio bearer SRB2 and the identifier information that are received by the receiving module.

The first sending module 103 is further configured to send an eighth reconfiguration message to the wearable device. The eighth reconfiguration message carries second configuration information for establishing a signaling radio bearer SRB2. The second configuration information for establishing a signaling radio bearer SRB2 is used by the wearable device to perform signaling radio bearer establishment resource configuration, and is generated by the user equipment according to the first configuration information for establishing a signaling radio bearer SRB2.

The first receiving module 101 is further configured to receive a reconfiguration complete message sent by the wearable device.

The first sending module 103 is further configured to send, to the base station, the reconfiguration complete message received by the first receiving module 101. The reconfiguration complete message is used to inform the base station that the wearable device has completed radio bearer establishment resource configuration, and the reconfiguration complete message carries the identifier information.

The first resource configuration module is used to establish an SRB2 for transmitting a NAS message, so that the base station can transmit the NAS message to the user equipment without performing parsing processing. This reduces processing load of the base station.

On a basis that a DRB is established between the wearable device and the base station, the first sending module sends the first configuration information to the wearable device. The first resource configuration module completes SRB2 establishment radio configuration on the first interface and the second interface according to an indication of the first configuration information. The user equipment generates, according to the first configuration information for establishing an SRB2, the second configuration information for establishing an SRB2, and sends the second configuration information to the wearable device, so that the wearable device can autonomously perform different services according to the second configuration information.

Figure 11:
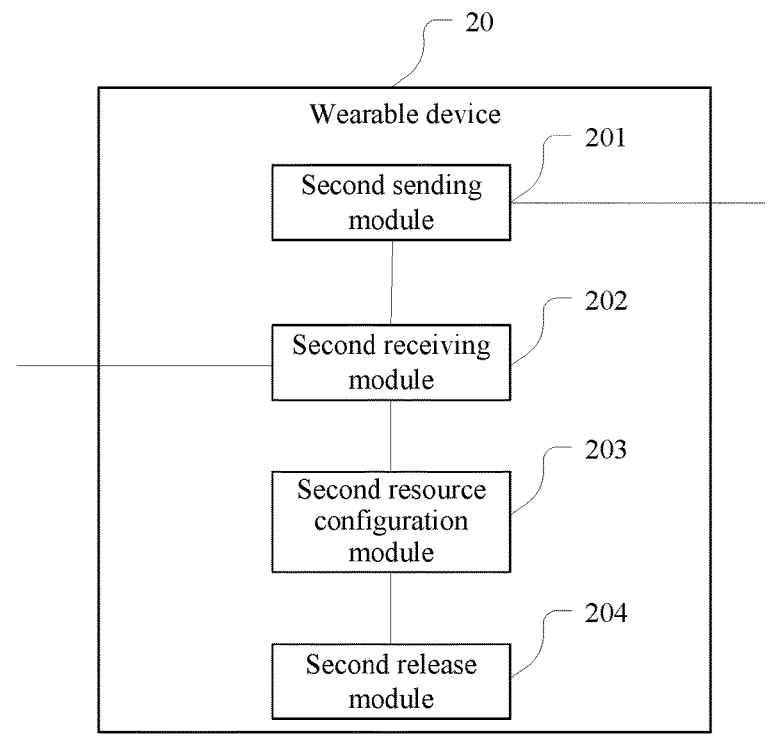
FIG. 11 is a schematic diagram of an embodiment of a wearable device according to the embodiments of the present invention.

The user equipment in the embodiments of the present invention is described above, and a wearable device in the embodiments of the present invention is described below. Referring to FIG. 11, an embodiment of a wearable device 20 in the embodiments of the present invention includes a second sending module 201, a second receiving module 202, a second resource configuration module 203, and a second release module 204.

The second sending module 201 is configured to send a radio resource control RRC connection request to user equipment. The RRC connection request carries identifier information of the wearable device.

The second receiving module 202 is configured to receive an RRC connection response sent by the user equipment. The RRC connection response is generated by the user equipment according to the RRC connection request.

The second sending module 201 is further configured to send an RRC connection establishment complete message to the wearable device according to the RRC connection response received by the second receiving module 202, so that the user equipment sends an RRC message to a base station. The RRC message is used to indicate that an RRC connection has been established between the wearable device and the user equipment, and the RRC message includes the identifier information used to identify the wearable device.

The second receiving module 202 is further configured to receive second configuration information sent by the user equipment.

The second resource configuration module 203 is configured to perform radio configuration according to the second configuration information received by the second receiving module 202. The second configuration information is generated by the user equipment according to the first configuration information, and the first configuration information is sent by the base station to the user equipment.

Optionally, the second resource configuration module 203 is further configured to perform DRB establishment resource configuration according to second configuration information for establishing a DRB received by the second receiving module 202.

The second sending module 201 is further configured to send a reconfiguration complete message to the user equipment. The reconfiguration message is used to instruct the user equipment to send the reconfiguration complete message to the base station, and is used to inform the base station that the wearable device has completed radio bearer establishment resource configuration. The reconfiguration complete message carries the identifier information.

Optionally, the second receiving module 202 is further configured to receive a wearable device index sent by the user equipment. The wearable device index is obtained by configuring, by the user equipment, an index corresponding to the identifier information of the wearable device.

Optionally, the second receiving module 202 is further configured to receive a fourth reconfiguration message sent by the user equipment. The fourth reconfiguration message carries second configuration information for modifying a DRB.

The second resource configuration module 203 is further configured to perform DRB modification resource configuration according to the second configuration information for modifying a DRB received by the second receiving module 202.

Optionally, the second receiving module 202 is further configured to receive a sixth reconfiguration message sent by the user equipment. The sixth reconfiguration message carries second configuration information for releasing a DRB.

The second release module 203 is configured to perform DRB release resource configuration according to the second configuration information for releasing a DRB received by the second receiving module 202.

In this embodiment of the present invention, an RRC connection is established between the wearable device and the user equipment, so that signaling transmission can be performed between the base station and the wearable device. On a basis that a DRB has been established between the wearable device and the base station, the wearable device receives the second configuration information sent by the user equipment, and completes DRB release radio configuration according to an indication of the second configuration information, so as to save network radio resources.

Referring to FIG. 11 again, another embodiment of the wearable device in the embodiments of the present invention includes:

The second sending module 201 sends a radio resource control RRC connection request to user equipment. The RRC connection request carries identifier information of the wearable device.

The second receiving module 202 receives an RRC connection response sent by the user equipment. The RRC connection response is generated by the user equipment according to the RRC connection request.

The second sending module 201 is further configured to send an RRC connection establishment complete message to the wearable device according to the RRC connection response received by the second receiving module 202, so that the user equipment sends an RRC message to a base station. The RRC message is used to indicate that an RRC connection has been established between the wearable device and the user equipment, and the RRC message includes the identifier information used to identify the wearable device.

The second receiving module 202 is further configured to receive second configuration information sent by the user equipment.

The second resource configuration module 203 is further configured to perform radio configuration according to the second configuration information received by the second receiving module 202. The second configuration information radio configuration.

Optionally, the second receiving module 202 is further configured to receive an eighth reconfiguration message sent by the user equipment. The eighth reconfiguration message carries second configuration information for establishing a signaling radio bearer. The second configuration information for establishing a signaling radio bearer is used by the wearable device to perform signaling radio bearer resource configuration.

The second sending module 201 is further configured to send a reconfiguration complete message to the user equipment. The reconfiguration message is used to instruct the user equipment to send the reconfiguration complete message to the base station, and is used to inform the base station that the wearable device has completed radio bearer establishment resource configuration. The reconfiguration complete message carries the identifier information.

Optionally, the second receiving module 202 is further configured to receive a first RRC connection release message sent by the user equipment. The first RRC connection release message carries the identifier information.

The second release module 203 is further configured to: release, according to the first RRC connection release message received by the second receiving module 202, the RRC connection between the wearable device and the user equipment, and release a radio resource.

The wearable device releases the RRC connection between the wearable device and the user equipment by using the second release module, so as to save radio resources.

In a scenario in which the wearable device is connected to the base station by using the user equipment, an RRC connection is established between the user equipment and the base station, and an RRC connection is established between the wearable device and the user equipment, so that signaling transmission can be performed between the base station and the wearable device. The wearable device receives the second configuration information sent by the user equipment, and completes radio configuration according to an indication of the second configuration information, so that the wearable device can autonomously perform a related service.

Figure 12:
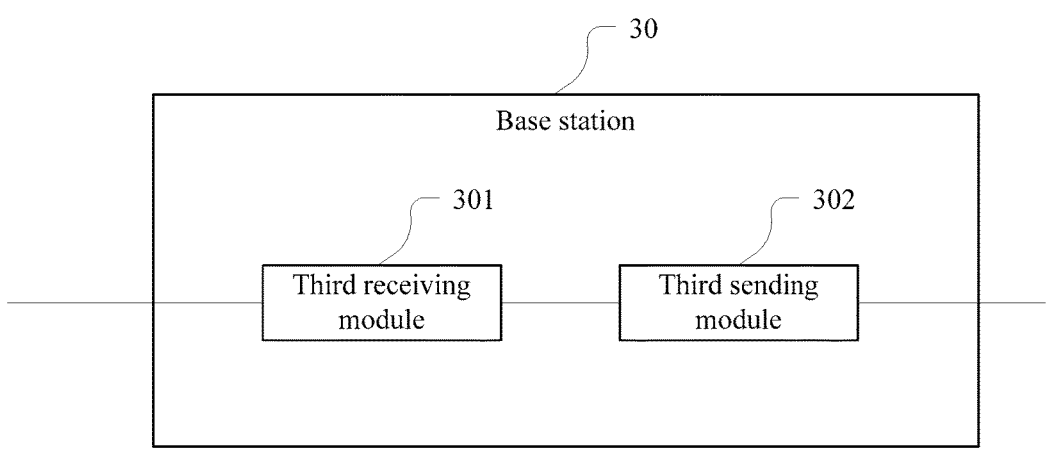
FIG. 12 is a schematic diagram of an embodiment of a base station according to the embodiments of the present invention.

The wearable device in the embodiments of the present invention is described above, and the base station in the embodiments of the present invention is described below. Referring to FIG. 12, an embodiment of a base station 30 in the embodiments of the present invention includes a third receiving module 301, a third sending module 302, and a third release module 303.

The third receiving module 301 receives an RRC message sent by user equipment. The RRC message carries identifier information used to identify a wearable device, and is used to indicate that an RRC connection has been established between the wearable device and the user equipment.

The third sending module 302 sends the identifier information and first configuration information to the user equipment. The first configuration information is used to instruct the user equipment to perform radio configuration on a first interface and a second interface. The first interface is a communications interface between the user equipment and the base station, and the second interface is a communications interface between the user equipment and the wearable device.

Optionally, the third sending module 302 is further configured to send a first reconfiguration message to the user equipment. The first reconfiguration message carries the identifier information and first configuration information for establishing a data radio bearer DRB. The first configuration information for establishing a data radio bearer DRB is used to instruct the user equipment to perform DRB establishment resource configuration on the first interface and the second interface. Second configuration information for establishing a data radio bearer DRB is carried in a second reconfiguration message sent by the user equipment to the wearable device. The second configuration information for establishing a DRB is used by the wearable device to perform DRB establishment resource configuration, and is generated by the user equipment according to the first configuration information for establishing a DRB.

In this embodiment, in a scenario in which the wearable device is connected to the base station by using the user equipment, an RRC connection is established between the base station and the user equipment, and an RRC connection is established between the wearable device and the user equipment, so that signaling transmission can be performed between the base station and the wearable device. The base station sends, by using the user equipment, the first configuration information for establishing a DRB to the wearable device, so that the user equipment performs radio configuration on the first interface and the second interface according to an indication of the first configuration information, so as to establish a communications channel between the base station and the wearable device for data transmission.

Based on the embodiment corresponding to FIG. 12, another embodiment of the base station in the embodiments of the present invention includes:

The third sending module 302 is further configured to send a third reconfiguration message to the user equipment. The third reconfiguration message carries the identifier information and first configuration information for modifying a DRB. The first configuration information for establishing a data radio bearer DRB is used to instruct the user equipment to perform DRB modification resource configuration on the first interface and the second interface. Second configuration information for modifying a DRB is carried in a fourth reconfiguration message sent by the user equipment to the wearable device. The second configuration information for modifying a DRB is used by the wearable device to perform DRB modification resource configuration, and is generated by the user equipment according to the first configuration information for modifying a DRB.

In this embodiment, on a basis that the base station establishes a DRB with the wearable device by using the user equipment, the base station sends, by using the user equipment, the first configuration information for modifying a DRB to the wearable device, so that the wearable device performs DRB modification radio configuration on the first interface and the second interface according to an indication of the first configuration information for modifying a DRB, and further, the wearable device can perform DRB modification radio configuration according to the second configuration information for modifying a DRB. Each DRB is corresponding to one service, and the wearable device can perform a service corresponding to a modified DRB.

Based on the embodiment corresponding to FIG. 12, referring to FIG. 12, another embodiment of the base station in the embodiments of the present invention includes:

Optionally, the third sending module 302 is further configured to send a fifth reconfiguration message to the user equipment. The fifth reconfiguration message carries the identifier information and first configuration information for releasing a DRB. The first configuration information for releasing a DRB is used to instruct the user equipment to perform DRB release resource configuration on the first interface and the second interface. Second configuration information for releasing a DRB is carried in a sixth reconfiguration message sent by the user equipment to the wearable device. The second configuration information for releasing a DRB is used by the wearable device to perform DRB release resource configuration, and is generated by the user equipment according to the first configuration information for releasing a DRB.

The third receiving module 301 is further configured to receive a second connection release message sent by the user equipment. The second RRC connection release message carries the identifier information of the wearable device.

The third release module 303 is configured to delete, according to the second RRC connection release message received by the third receiving module 301, context information of the wearable device corresponding to the identifier information. The context information of the wearable device is created by the base station according to the identifier information.

In this embodiment, on a basis that the base station establishes a DRB with the wearable device by using the user equipment, the base station sends, by using the user equipment, the first configuration information for releasing a DRB to the wearable device, so that the wearable device performs DRB release radio configuration on the first interface and the second interface according to an indication of the first configuration information, and further, the wearable device can perform DRB release radio configuration according to the second configuration information for releasing a DRB, so as to save radio resources.

Based on the embodiment corresponding to FIG. 12, another embodiment of the base station in the embodiments of the present invention includes:

Optionally, the third receiving module 301 is further configured to receive an RRC message sent by user equipment. The RRC message carries identifier information used to identify a wearable device, and is used to indicate that an RRC connection has been established between the wearable device and the user equipment.

The third sending module 302 is further configured to send a seventh reconfiguration message to the user equipment. The seventh reconfiguration message carries the identifier information and first configuration information for establishing a signaling radio bearer. The first configuration information for establishing a signaling radio bearer SRB2 is used to instruct to establish a signaling radio bearer SRB2 for transmitting a non-access stratum NAS message, and is used to instruct the user equipment to perform signaling radio bearer SRB2 establishment resource configuration on the first interface and the second interface. Second configuration information for establishing a signaling radio bearer is carried in an eighth reconfiguration message sent by the user equipment to the wearable device. The second configuration information for establishing a signaling radio bearer SRB2 is used by the wearable device to perform signaling radio bearer establishment resource configuration, and is generated by the user equipment according to the first configuration information for establishing a signaling radio bearer SRB2.

In a scenario in which the wearable device is connected to the base station by using the user equipment, an RRC connection is established between the user equipment and the base station, and an RRC connection is established between the wearable device and the user equipment, so that signaling transmission can be performed between the base station and the wearable device. The base station sends the first configuration information corresponding to the wearable device to the user equipment, so that the wearable device and the base station can perform service data transmission. The user equipment sends the generated second configuration information to the wearable device. The wearable device completes radio configuration according to an indication of the second configuration information, and establishes a communications channel with the base station by using the user equipment, so that the wearable device can autonomously perform a related service.

Figure 13:
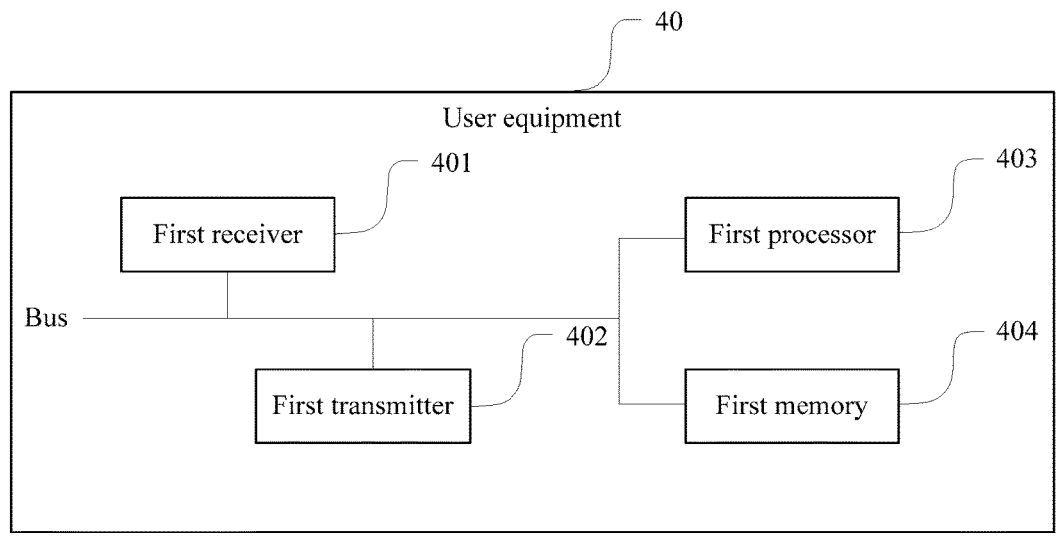
FIG. 13 is a schematic diagram of another embodiment of user equipment according to the embodiments of the present invention.

Referring to FIG. 13, the embodiments of the present invention further provide an embodiment of user equipment 40, including:

a first receiver 401, a first transmitter 402, a bus, a first processor 403, and a first memory 404.

The first receiver 401, the first transmitter 402, the first processor 403, and the first memory 404 are all connected by using the bus.

The first receiver 401 receives an RRC connection request sent by a wearable device. The RRC connection request carries identifier information of the wearable device.

The first processor 403 establishes an RRC connection with the wearable device according to the RRC connection request received by the first receiver 401.

Further, the first receiver 401 receives the RRC connection request sent by the wearable device.

The first transmitter 402 sends an RRC connection response to the wearable device according to the RRC connection request received by the receiving unit.

The first receiver 401 is further configured to receive an RRC connection complete message sent by the wearable device. The RRC connection complete message is generated by the wearable device according to the RRC connection response.

The first processor 403 is configured to determine, according to the RRC connection complete message received by the receiving unit, that an RRC connection has been established between the user equipment and the wearable device.

The first transmitter 402 sends an RRC connection establishment complete message to a base station. The RRC message is used to indicate that an RRC connection has been established between the wearable device and the user equipment, and the RRC message includes the identifier information used to identify the wearable device.

The first receiver 401 receives the identifier information and first configuration information that are sent by the base station.

The first processor 403 performs radio configuration on a first interface and a second interface according to the first configuration information and the identifier information that are received by the first receiver 401, where the first interface is a communications interface between the user equipment and the base station, and the second interface is a communications interface between the user equipment and the wearable device; and generates second configuration information according to the first configuration information.

The first transmitter 402 sends the second configuration information to the wearable device. The second configuration information is used by the wearable device to perform radio configuration.

Optionally, the first receiver 401 is further configured to receive a first reconfiguration message sent by the base station. The first reconfiguration message carries the identifier information and first configuration information for establishing a data radio bearer DRB.

The first processor 403 is further configured to: perform DRB establishment resource configuration on the first interface and the second interface according to the first configuration information for establishing a DRB and the identifier information that are received by the first receiving module; and generate, according to the first configuration information for establishing a DRB, second configuration information for establishing a DRB.

The first transmitter 402 is further configured to send a second reconfiguration message to the wearable device. The second reconfiguration message carries the second configuration information for establishing a DRB, and the second configuration information for establishing a DRB is used by the wearable device to perform DRB establishment resource configuration.

The first receiver 401 is further configured to receive a reconfiguration complete message sent by the wearable device.

The first transmitter 402 is further configured to send the reconfiguration complete message to the base station according to the reconfiguration complete message received by the first receiving module. The reconfiguration complete message is used to inform the base station that the wearable device has completed radio bearer establishment resource configuration, and the reconfiguration complete message carries the identifier information.

Optionally, the first receiver 401 is further configured to receive a third reconfiguration message sent by the base station. The third reconfiguration message carries the identifier information and first configuration information for modifying a DRB.

The first processor 403 is further configured to: perform DRB modification resource configuration on the first interface and the second interface according to the first configuration information for modifying a DRB and the identifier information that are received by the first receiving module; and generate, according to the first configuration information for modifying a DRB, second configuration information for modifying a DRB.

The first transmitter 402 is further configured to send a fourth reconfiguration message to the wearable device. The fourth reconfiguration message carries the second configuration information for modifying a DRB, and the second configuration information for modifying a DRB is used by the wearable device to perform DRB modification resource configuration.

Optionally, the first receiver 401 is further configured to receive a seventh reconfiguration message sent by the base station. The seventh reconfiguration message carries the identifier information and first configuration information for establishing a signaling radio bearer, and the first configuration information for establishing a signaling radio bearer is used to transmit a non-access stratum NAS message.

The first processor 403 is further configured to: perform signaling radio bearer establishment resource configuration on the first interface and the second interface according to the first configuration information for establishing a signaling radio bearer and the identifier information that are received by the receiving module; and generate, according to the first configuration information for establishing a signaling radio bearer, second configuration information for establishing a signaling radio bearer.

The first transmitter 402 is further configured to send an eighth reconfiguration message to the wearable device. The eighth reconfiguration message carries the second configuration information for establishing a signaling radio bearer. The second configuration information for establishing a signaling radio bearer is used by the wearable device to perform signaling radio bearer establishment resource configuration.

The first receiver 401 is further configured to receive a reconfiguration complete message sent by the wearable device.

The first transmitter 402 is further configured to send, to the base station, the reconfiguration complete message received by the first receiving module. The reconfiguration complete message is used to inform the base station that the wearable device has completed radio bearer establishment resource configuration, and the reconfiguration complete message carries the identifier information.

In this embodiment, an SRB2 is established between the wearable device and the base station for transmitting a NAS message, and the base station transmits the NAS message to the user equipment without performing parsing processing. This reduces processing load of the base station.

Optionally, the first transmitter 402 is further configured to send a first RRC connection release message to the wearable device. The RRC connection release message carries the identifier information.

The first processor 403 is configured to release a radio resource that is allocated to the wearable device indicated by the identifier information.

The first transmitter 402 is further configured to send a second RRC connection release message to the base station. The second RRC connection release message carries the identifier information, and is used to inform the base station that an RRC connection indicated by the identifier information has been released.

In this embodiment, the user equipment may release the RRC connection between the user equipment and the wearable device, to reduce radio resource overheads.

Optionally, the first processor 403 is configured to configure, for the wearable device, a wearable device index corresponding to the identifier information of the wearable device.

The first transmitter 402 is further configured to send the wearable device index to the wearable device. The wearable device index is used to identify the wearable device.

In a scenario in which the wearable device is connected to the base station by using the user equipment, the user equipment establishes an RRC connection with the base station, and establishes an RRC connection with the wearable device, so that signaling transmission can be performed between the base station and the wearable device. The base station sends the first configuration information to the user equipment, and the user equipment performs configuration on the first interface and the second interface according to the first configuration information. The user equipment generates the second configuration information according to the first configuration information, and sends the second configuration information to the wearable device. The wearable device completes radio configuration according to an indication of the second configuration information, so that the wearable device and the base station can perform service data transmission, and the wearable device can autonomously perform a related service.

Figure 14:
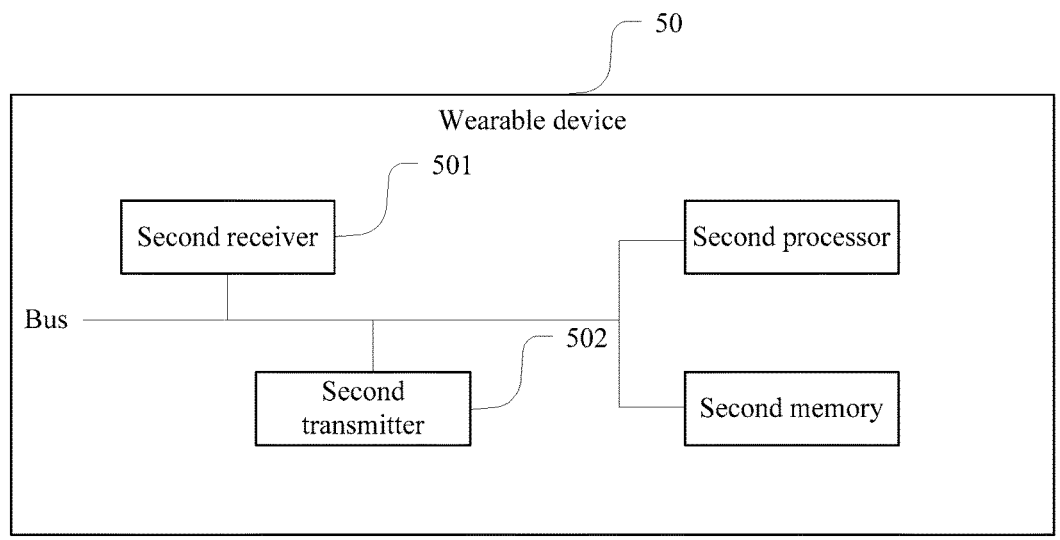
FIG. 14 is a schematic diagram of another embodiment of a wearable device according to the embodiments of the present invention.

Referring to FIG. 14, the embodiments of the present invention further provide another embodiment of a wearable device 50, including:

a second receiver 501, a second transmitter 502, a bus, a second processor 503, and a second memory 504.

The second receiver 501, the second transmitter 502, the second processor 503, and the second memory 504 are all connected by using the bus.

The second transmitter 502 sends a radio resource control RRC connection request to user equipment. The RRC connection request carries identifier information of the wearable device.

The second receiver 501 receives an RRC connection response sent by the user equipment. The RRC connection response is generated by the user equipment according to the RRC connection request.

The second transmitter 502 is further configured to send an RRC connection establishment complete message to the wearable device according to the RRC connection response received by the second receiver 501, so that the user equipment sends an RRC message to a base station. The RRC message is used to indicate that an RRC connection has been established between the wearable device and the user equipment, and the RRC message includes the identifier information used to identify the wearable device.

The second receiver 501 receives second configuration information sent by the user equipment. The second configuration information is generated by the user equipment according to the first configuration information, and the first configuration information is sent by the base station to the user equipment.

The second processor 503 performs radio configuration according to the second configuration information received by the second receiving module.

Optionally, the second receiver 501 is further configured to receive a second reconfiguration message sent by the user equipment. The second reconfiguration message carries second configuration information for establishing a DRB.

The second processor 503 is further configured to perform DRB establishment resource configuration according to the second configuration information for establishing a DRB received by the second receiving module.

The second transmitter 502 is further configured to send a reconfiguration complete message to the user equipment. The reconfiguration message is used to instruct the user equipment to send the reconfiguration complete message to the base station, and is used to inform the base station that the wearable device has completed radio bearer establishment resource configuration. The reconfiguration complete message carries the identifier information.

In this embodiment, the wearable device completes DRB establishment radio configuration according to an indication of the received second configuration information sent by the user equipment, so that the wearable device can autonomously perform a related service.

Optionally, the second receiver 501 is further configured to receive a fourth reconfiguration message sent by the user equipment. The fourth reconfiguration message carries second configuration information for modifying a DRB.

The second processor 503 is further configured to perform DRB modification resource configuration according to the second configuration information for modifying a DRB received by the second receiving module.

In this embodiment, the wearable device completes DRB modification radio configuration according to an indication of the received second configuration information sent by the user equipment. Each DRB is corresponding to one service, and the wearable device can perform a service corresponding to a modified DRB.

Optionally, the second receiver 501 is further configured to receive a sixth reconfiguration message sent by the user equipment. The sixth reconfiguration message carries second configuration information for releasing a DRB.

The second processor 503 is further configured to perform DRB release resource configuration according to the second configuration information for releasing a DRB received by the second receiving module.

In this embodiment, the wearable device completes DRB release radio configuration according to an indication of the received second configuration information sent by the user equipment, to save radio resources.

Optionally, the second receiver 501 is further configured to receive an eighth reconfiguration message sent by the user equipment. The eighth reconfiguration message carries second configuration information for establishing a signaling radio bearer.

The second processor 503 performs signaling radio bearer establishment resource configuration according to the second configuration information for establishing a signaling radio bearer.

The second transmitter 502 is further configured to send a reconfiguration complete message to the user equipment. The reconfiguration message is used to instruct the user equipment to send the reconfiguration complete message to the base station, and is used to inform the base station that the wearable device has completed resource configuration. The reconfiguration complete message carries the identifier information.

Optionally, the second receiver 501 is further configured to receive a first RRC connection release message sent by the user equipment. The first RRC connection release message carries the identifier information.

The second processor 503 is further configured to: release, according to the first RRC connection release message received by the second receiving module, the RRC connection between the wearable device and the user equipment, and release a radio resource.

In this embodiment, the wearable device releases the RRC connection between the wearable device and the user equipment, to save radio resources.

Optionally, the second receiver 501 is further configured to receive a wearable device index sent by the user equipment. The wearable device index is obtained by configuring, by the user equipment, an index corresponding to the identifier information of the wearable device.

In a scenario in which the wearable device is connected to the base station by using the user equipment, an RRC connection is established between the user equipment and the base station, and an RRC connection is established between the wearable device and the user equipment, so that signaling transmission can be performed between the base station and the wearable device. The wearable device receives the second configuration information sent by the user equipment, and completes radio configuration according to an indication of the second configuration information, so that the wearable device can autonomously perform a related service.

Figure 15:
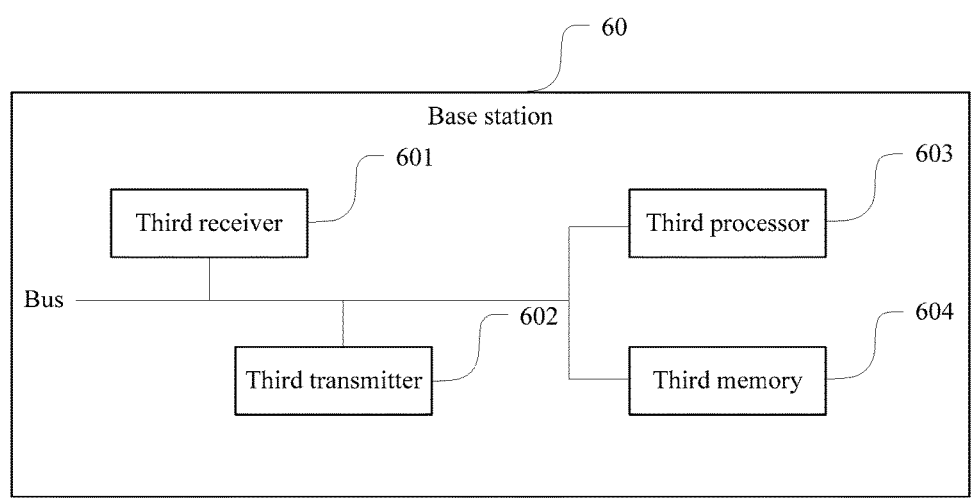
FIG. 15 is a schematic diagram of another embodiment of a base station according to the embodiments of the present invention.

Referring to FIG. 15, the embodiments of the present invention further provide another embodiment of a base station 60, including:

a third receiver 601, a third transmitter 602, a bus, a third processor 603, and a third memory 604.

The third receiver 601, the third transmitter 602, the third processor 603, and the third memory 604 are all connected by using the bus.

The third receiver 601 receives an RRC message sent by user equipment. The RRC message carries identifier information used to identify a wearable device, and is used to indicate that an RRC connection has been established between the wearable device and the user equipment.

The third transmitter 602 sends, to the user equipment, the identifier information and first configuration information for configuring the wearable device. The first configuration information is used to instruct the user equipment to perform radio configuration on a first interface and a second interface. The first interface is a communications interface between the user equipment and the base station, and the second interface is a communications interface between the user equipment and the wearable device. The first configuration information is used by the wearable device to perform radio configuration.

Optionally, the third transmitter 602 is further configured to send a first reconfiguration message to the user equipment. The first reconfiguration message carries the identifier information and first configuration information for establishing a data radio bearer DRB. The first configuration information for establishing a data radio bearer DRB is used to instruct the user equipment to perform DRB establishment resource configuration on the first interface and the second interface. Second configuration information for establishing a data radio bearer DRB is carried in a second reconfiguration message sent by the user equipment to the wearable device. The second configuration information for establishing a DRB is used by the wearable device to perform DRB establishment resource configuration, and is generated by the user equipment according to the first configuration information for establishing a DRB.

In a scenario in which the wearable device is connected to the base station by using the user equipment, an RRC connection is established between the base station and the user equipment, and an RRC connection is established between the wearable device and the user equipment, so that signaling transmission can be performed between the base station and the wearable device. The base station sends, by using the user equipment, the first configuration information for establishing a DRB to the wearable device, so that the user equipment performs DRB establishment resource configuration on the first interface and the second interface according to the first configuration information for establishing a DRB, the base station and the wearable device establish a communications channel, and the wearable device completes DRB establishment radio configuration according to an indication of the second configuration information.

Optionally, the third transmitter 602 is further configured to send a third reconfiguration message to the user equipment. The third reconfiguration message carries the identifier information and first configuration information for modifying a DRB. The first configuration information for establishing a data radio bearer DRB is used to instruct the user equipment to perform DRB modification resource configuration on the first interface and the second interface. Second configuration information for modifying a DRB is carried in a fourth reconfiguration message sent by the user equipment to the wearable device, and is used by the wearable device to perform DRB modification resource configuration.

The second configuration information for modifying a DRB is generated by the user equipment according to the first configuration information for modifying a DRB.

In this embodiment, the base station sends, by using the user equipment, the first configuration information for modifying a DRB to the wearable device, so that the user equipment performs DRB modification resource configuration on the first interface and the second interface according to the first configuration information for modifying a DRB, the wearable device and the base station establish a communications channel, and the wearable device completes DRB modification radio configuration according to an indication of the second configuration information.

Optionally, the third transmitter 602 is further configured to send a fifth reconfiguration message to the user equipment. The fifth reconfiguration message carries the identifier information and first configuration information for releasing a DRB. The first configuration information for releasing a DRB is used to instruct the user equipment to perform DRB release resource configuration on the first interface and the second interface. Second configuration information for releasing a DRB is carried in a sixth reconfiguration message sent by the user equipment to the wearable device. The second configuration information for releasing a DRB is used by the wearable device to perform DRB release resource configuration, and is generated by the user equipment according to the first configuration information for releasing a DRB.

In this embodiment, the base station sends, by using the user equipment, the first configuration information for releasing a DRB to the wearable device, so that the user equipment performs DRB release resource configuration on the first interface and the second interface according to the first configuration information for releasing a DRB, the wearable device and the base station establish a communications channel, and the wearable device completes DRB release radio configuration according to an indication of the second configuration information for releasing a DRB.

Optionally, the third transmitter 602 is further configured to send a seventh reconfiguration message to the user equipment. The seventh reconfiguration message carries the identifier information and first configuration information for establishing a signaling radio bearer. The first configuration information for establishing a signaling radio bearer is used to transmit a non-access stratum NAS message, and is used to instruct the user equipment to perform signaling radio bearer establishment resource configuration on the first interface and the second interface. Second configuration information for establishing a signaling radio bearer is carried in an eighth reconfiguration message sent by the user equipment to the wearable device. The second configuration information for establishing a signaling radio bearer is used by the wearable device to perform signaling radio bearer establishment resource configuration, and is generated by the user equipment according to the first configuration information for establishing a signaling radio bearer.

Optionally, the third receiver 601 is configured to receive a second connection release message sent by the user equipment. The second RRC connection release message carries the identifier information of the wearable device.

The third processor 603 is configured to delete, according to the second RRC connection release message received by the third receiving module, context information of the wearable device corresponding to the identifier information. The context information of the wearable device is created by the base station according to the identifier information.

In this embodiment, the base station releases the RRC connection between the base station and the user equipment, to save radio resources.

In a scenario in which the wearable device is connected to the base station by using the user equipment, an RRC connection is established between the user equipment and the base station, and an RRC connection is established between the wearable device and the user equipment, so that signaling transmission can be performed between the base station and the wearable device. The base station sends the first configuration information to the user equipment. The first configuration information is used to instruct the user equipment to configure the first interface and the second interface according to the first configuration information, so that a communications channel is established between the wearable device and the base station, and data transmission can be performed between the base station and the wearable device.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a portable hard disk, a read-only memory (ROM, Read-Only Memory), a random access memory (RAM, Random Access Memory), a magnetic disk, or an optical disc.

The foregoing embodiments are merely intended for describing the technical solutions of the present invention other than limiting the present invention. Although the present invention is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A radio configuration method for a wearable device, comprising:
    receiving, by user equipment, a radio resource control (RRC) connection request sent by a wearable device, wherein the RRC connection request carries an identifier information used to identify the wearable device;
    establishing, by the user equipment, an RRC connection with the wearable device according to the RRC connection request;
    sending, by the user equipment, an RRC message to a base station, wherein the RRC message indicates that the RRC connection has been established between the wearable device and the user equipment, and the RRC message comprises the identifier information;
    receiving, by the user equipment, the identifier information and first configuration information that are sent by the base station, wherein the receiving, by the user equipment, the identifier information and the first configuration information that are sent by the base station comprises receiving, by the user equipment, a first reconfiguration message sent by the base station, wherein the first reconfiguration message carries the identifier information and first configuration information for establishing a data radio bearer (DRB);
    performing, by the user equipment, radio configuration on a first interface and a second interface according to the first configuration information and the identifier information, wherein the first interface is a communications interface between the user equipment and the base station, and the second interface is a communications interface between the user equipment and the wearable device, wherein the performing, by the user equipment, radio configuration on the first interface and the second interface according to the first configuration information and the identifier information comprises performing, by the user equipment, DRB establishment resource configuration on the first interface and the second interface according to the first configuration information for establishing the DRB and the identifier information;
    generating, by the user equipment, second configuration information according to the first configuration information; and sending, by the user equipment, the second configuration information to the wearable device, wherein the second configuration information instructs the wearable device to perform radio configuration, and wherein the sending, by the user equipment, the second configuration information to the wearable device, wherein the second configuration information instructs the wearable device to perform radio configuration comprises: sending, by the user equipment, a second reconfiguration message to the wearable device, wherein the second reconfiguration message carries the first configuration information for establishing the DRB, and the first configuration information for establishing the DRB instructs the wearable device to perform DRB establishment resource configuration.

2. The radio configuration method according to claim 1, wherein the generating, by the user equipment, second configuration information according to the first configuration information comprises:

generating, by the user equipment, the second configuration information according to configuration information corresponding to the second interface in the first configuration information.

3. The radio configuration method according to claim 1, wherein the method further comprises:

receiving, by the user equipment, a reconfiguration complete message sent by the wearable device; and sending, by the user equipment, the reconfiguration complete message to the base station, wherein the reconfiguration complete message informs the base station that the wearable device has completed radio bearer establishment resource configuration, and the reconfiguration complete message carries the identifier information.

4. The radio configuration method according to claim 3, wherein after the receiving, by the user equipment, the reconfiguration complete message sent by the wearable device, and sending the reconfiguration complete message to the base station, the method further comprises:

receiving, by the user equipment, a third reconfiguration message sent by the base station, wherein the third reconfiguration message carries the identifier information and first configuration information for modifying a DRB;

performing, by the user equipment, DRB modification resource configuration on the first interface and the second interface according to the first configuration information for modifying a DRB and the identifier information; and sending, by the user equipment, a fourth reconfiguration message to the wearable device, wherein the fourth reconfiguration message carries second configuration information for modifying a DRB, and the second configuration information for modifying the DRB instructs the wearable device to perform DRB modification resource configuration.

5. The radio configuration method according to claim 3, wherein after the receiving, by the user equipment, a reconfiguration complete message sent by the wearable device, and sending the reconfiguration complete message to the base station, the method further comprises:

receiving, by the user equipment, a fifth reconfiguration message sent by the base station, wherein the fifth reconfiguration message carries the identifier information and first configuration information for releasing a DRB;

performing, by the user equipment, DRB release resource configuration on the first interface and the second interface according to the first configuration information for releasing a DRB and the identifier information; and sending, by the user equipment, a sixth reconfiguration message to the wearable device, wherein the sixth reconfiguration message carries second configuration information for releasing a DRB, and the second configuration information for releasing the DRB instructs the wearable device to perform DRB release resource configuration.

6. The radio configuration method according to claim 1, wherein the receiving, by the user equipment, the identifier information and first configuration information that are sent by the base station comprises:

receiving, by the user equipment, a seventh reconfiguration message sent by the base station, wherein the seventh reconfiguration message carries the identifier information and first configuration information for establishing a signaling radio bearer, and the first configuration information for establishing a signaling radio bearer carries a non-access stratum (NAS) message;

the performing, by the user equipment, radio configuration on the first interface and the second interface according to the first configuration information and the identifier information comprises:

performing, by the user equipment, signaling radio bearer establishment resource configuration on the first interface and the second interface according to the first configuration information for establishing a signaling radio bearer and the identifier information;

the sending, by the user equipment, the second configuration information to the wearable device, wherein the second configuration information instructs the wearable device to perform radio configuration comprises:

sending, by the user equipment, an eighth reconfiguration message to the wearable device, wherein the eighth reconfiguration message carries the second configuration information for establishing a signaling radio bearer, and the second configuration information for establishing the signaling radio bearer instructs the wearable device to perform signaling radio bearer establishment resource configuration; and the method further comprises:

receiving, by the user equipment, a reconfiguration complete message sent by the wearable device; and sending, by the user equipment, the reconfiguration complete message to the base station, wherein the reconfiguration complete message informs the base station that the wearable device has completed radio bearer establishment resource configuration, and the reconfiguration complete message carries the identifier information.

7. The radio configuration method according to claim 1, wherein the establishing, by the user equipment, the RRC connection with the wearable device according to the RRC connection request comprises:

receiving, by the user equipment, the RRC connection request sent by the wearable device;

sending, by the user equipment, an RRC connection response to the wearable device according to the RRC connection request;

receiving, by the user equipment, an RRC connection complete message sent by the wearable device, wherein the RRC connection complete message is generated by the wearable device according to the RRC connection response; and determining, by the user equipment according to the RRC connection complete message, that the RRC connection has been established between the user equipment and the wearable device.

8. The radio configuration method according to claim 1, wherein after the sending, by the user equipment, the first configuration information to the wearable device, the method further comprises:

sending, by the user equipment, a first RRC connection release message to the wearable device, wherein the first RRC connection release message carries the identifier information;

releasing, by the user equipment, a radio resource that is allocated to the wearable device indicated by the identifier information; and sending, by the user equipment, a second RRC connection release message to the base station, wherein the second RRC connection release message carries the identifier information, and informs the base station that the RRC connection indicated by the identifier information has been released.

9. A user equipment, comprising:
a receiver;
a transmitter;
at least one processor; and
a non-transitory computer-readable storage medium coupled to the at least one processor and storing programming instructions for execution by the user equipment, the programming instructions instruct the user equipment to:

receive an RRC connection request sent by a wearable device, wherein the RRC connection request carries identifier information of the wearable device;

establish an RRC connection with the wearable device according to the RRC connection request;

send an RRC connection establishment complete message to a base station, wherein the RRC message indicates that the RRC connection has been established between the wearable device and the user equipment, and the RRC message comprises the identifier information identifying the wearable device, and the identifier information comprises the identifier information or an index configured for the wearable device corresponding to the identifier information;

receive the identifier information and first configuration information that are sent by the base station by receiving a first reconfiguration message sent by the base station, wherein the first reconfiguration message carries the identifier information and first configuration information for establishing a data radio bearer (DRB);

perform radio configuration on a first interface and a second interface according to the first configuration information and the identifier information by performing DRB establishment resource configuration on the first interface and the second interface according to the first configuration information for establishing the DRB and the identifier information, wherein the first interface is a communications interface between the user equipment and the base station, and the second interface is a communications interface between the user equipment and the wearable device; and generate second configuration information according to the first configuration information; and send the second configuration information to the wearable device, wherein the second configuration information instructs the wearable device to perform radio configuration, wherein the second configuration information comprises a second reconfiguration message that carries the first configuration information for establishing the DRB, and the first configuration information for establishing the DRB instructs the wearable device to perform DRB establishment resource configuration.

10. The user equipment according to claim 9, wherein the programming instructions further instruct the user equipment to:

generate the second configuration information according to configuration information corresponding to the second interface in the first configuration information.

11. The user equipment according to claim 9, wherein the programming instructions further instruct the user equipment to:

receive a reconfiguration complete message sent by the wearable device; and send the reconfiguration complete message to the base station according to the reconfiguration complete message, wherein the reconfiguration complete message informs the base station that the wearable device has completed radio bearer establishment resource configuration, and the reconfiguration complete message carries the identifier information.

12. The user equipment according to claim 11, wherein the programming instructions further instruct the user equipment to:

receive a third reconfiguration message sent by the base station, wherein the third reconfiguration message carries the identifier information and first configuration information for modifying a DRB;

perform DRB modification resource configuration on the first interface and the second interface according to the first configuration information for modifying the DRB and the identifier information; and send a fourth reconfiguration message to the wearable device, wherein the fourth reconfiguration message carries second configuration information for modifying a DRB, and the second configuration information for modifying the DRB instructs the wearable device to perform DRB modification resource configuration.

13. The user equipment according to claim 11, wherein the programming instructions further instruct the user equipment to:

receive a fifth reconfiguration message sent by the base station, wherein the fifth reconfiguration message carries the identifier information and first configuration information for releasing a DRB;

perform DRB release resource configuration on the first interface and the second interface according to the first configuration information for releasing the DRB and the identifier information; and send a sixth reconfiguration message to the wearable device, wherein the sixth reconfiguration message carries second configuration information for releasing a DRB, and the second configuration information for releasing the DRB instructs the wearable device to perform DRB release resource configuration.

14. The user equipment according to claim 9, wherein the programming instructions further instruct the user equipment to:

receive a seventh reconfiguration message sent by the base station, wherein the seventh reconfiguration message carries the identifier information and first configuration information for establishing a signaling radio bearer, and the first configuration information for establishing a signaling radio bearer carries a non-access stratum (NAS) message;

perform signaling radio bearer establishment resource configuration on the first interface and the second interface according to the first configuration information for establishing the signaling radio bearer and the identifier information;

send an eighth reconfiguration message to the wearable device, wherein the eighth reconfiguration message carries the second configuration information for establishing a signaling radio bearer, and the second configuration information for establishing the signaling radio bearer instructs the wearable device to perform signaling radio bearer establishment resource configuration;

receive a reconfiguration complete message sent by the wearable device; and send, to the base station, the reconfiguration complete message, wherein the reconfiguration complete message informs the base station that the wearable device has completed radio bearer establishment resource configuration, and the reconfiguration complete message carries the identifier information.

15. The user equipment according to claim 9, wherein the programming instructions further instruct the user equipment to:

receive the RRC connection request sent by the wearable device;

send an RRC connection response to the wearable device according to the RRC connection request;

receive an RRC connection complete message sent by the wearable device, wherein the RRC connection complete message is generated by the wearable device according to the RRC connection response; and determine, according to the RRC connection complete message, that the RRC connection has been established between the user equipment and the wearable device.

16. The user equipment according to claim 9, wherein the programming instructions further instruct the user equipment to:

send a first RRC connection release message to the wearable device, wherein the first RRC connection release message carries the identifier information;

release a radio resource that is allocated to the wearable device indicated by the identifier information; and send a second RRC connection release message to the base station, wherein the second RRC connection release message carries the identifier information, and informs the base station that the RRC connection indicated by the identifier information has been released.

17. A user equipment, comprising:

a first receiver, a first transmitter, a bus, at least one processor, and a first memory, wherein the first receiver, the first transmitter, the at least one processor, and the first memory are connected by the bus; and wherein the first memory stores programming instructions for execution by the user equipment, the programming instructions instruct:

the first receiver to receive an RRC connection request sent by a wearable device, wherein the RRC connection request carries identifier information of the wearable device;

the at least one processor to establish an RRC connection with the wearable device according to the RRC connection request received by the first receiver;

the first transmitter to send an RRC connection establishment complete message to a base station, wherein the RRC message indicates that the RRC connection has been established between the wearable device and the user equipment, and the RRC message comprises the identifier information identifying the wearable device;

the first receiver to receive the identifier information and first configuration information that are sent by the base station by receiving a first reconfiguration message sent by the base station, wherein the first reconfiguration message carries the identifier information and first configuration information for establishing a data radio bearer (DRB);

the at least one processor to perform radio configuration on a first interface and a second interface according to the first configuration information and the identifier information by performing DRB establishment resource configuration on the first interface and the second interface according to the first configuration information for establishing the DRB and the identifier information, wherein the first interface is a communications interface between the user equipment and the base station, and the second interface is a communications interface between the user equipment and the wearable device; and generates second configuration information according to the first configuration information; and the first transmitter to send the second configuration information to the wearable device, wherein the second configuration information instructs the wearable device to perform radio configuration, wherein the second configuration information comprises a second reconfiguration message that carries the first configuration information for establishing the DRB, and the first configuration information for establishing the DRB instructs the wearable device to perform DRB establishment resource configuration.

* * * * *